US007797224B2

(12) United States Patent
Barone et al.

(10) Patent No.: US 7,797,224 B2
(45) Date of Patent: Sep. 14, 2010

(54) SYSTEMS AND METHODS FOR AUTOMATICALLY BACKING OUT BY ORDERS

(75) Inventors: Joseph Anthony Barone, Nutley, NJ (US); William McKinney, Westfield, NJ (US); Michele Pierdinock, Hoboken, NJ (US); Hari Nanjundamoorthy, West Windsor, NJ (US)

(73) Assignee: CheckFree Corporation, Norcross, GA (US)

( * ) Notice: Subject to any disclaimer, the term of this patent is extended or adjusted under 35 U.S.C. 154(b) by 203 days.

(21) Appl. No.: 11/618,300

(22) Filed: Dec. 29, 2006

(65) Prior Publication Data

US 2008/0162326 A1    Jul. 3, 2008

(51) Int. Cl.
*G06Q 40/00*    (2006.01)
(52) U.S. Cl. ............................. 705/37; 705/35
(58) Field of Classification Search .............. 705/35, 705/37
See application file for complete search history.

(56) References Cited

U.S. PATENT DOCUMENTS

| 5,193,056 | A | 3/1993 | Boes |
| 5,784,696 | A | 7/1998 | Melnikoff |
| 5,806,047 | A | 9/1998 | Hackel et al. |
| 5,812,987 | A | 9/1998 | Luskin et al. |
| 5,978,778 | A | 11/1999 | O'Shaughnessy |
| 6,021,397 | A | 2/2000 | Jones et al. |
| 6,161,098 | A | 12/2000 | Wallman |
| 6,275,814 | B1 | 8/2001 | Giansante et al. |
| 6,282,520 | B1 | 8/2001 | Schirripa |
| 6,317,726 | B1 | 11/2001 | O'Shaughnessy |
| 6,338,047 | B1 | 1/2002 | Wallman |
| 6,484,152 | B1 | 11/2002 | Robinson |
| 6,513,019 | B2 | 1/2003 | Lewis |
| 6,516,303 | B1 | 2/2003 | Wallman |
| 7,174,313 | B1 | 2/2007 | Martinez |
| 7,356,499 | B1 * | 4/2008 | Amburn ...................... 705/37 |
| 2002/0038271 | A1 | 3/2002 | Friend et al. |
| 2002/0095364 | A1 | 7/2002 | Russell et al. |
| 2002/0107770 | A1 | 8/2002 | Meyer et al. |
| 2002/0138299 | A1 | 9/2002 | Nations |

(Continued)

OTHER PUBLICATIONS

PR Newswire; Placemark Introduces Overlay Management Services, Dec. 23, 2003, pp. 1-2.

(Continued)

*Primary Examiner*—James A Kramer
*Assistant Examiner*—James A Vezeris
(74) *Attorney, Agent, or Firm*—Sutherland Asbill & Brennan LLP

(57) ABSTRACT

A system and method for identifying a candidate set of one or more buy orders associated with an investment account, ordering the buy orders in the candidate set into a chain, determining a back out target value that identifies a fiscal amount by which the candidate set must be reduced, and decrementing an initial asset quantity of one or more successive non-zero quantity buy orders in the chain by a fixed integer quantity to a final asset quantity until the back out target value is achieved. The candidate set of buy orders can then be modified by replacing the respective initial asset quantity with the respective final asset quantity for at least one of the one or more buy orders. The modified candidate set of buy orders can then be provided for trade execution.

24 Claims, 13 Drawing Sheets

U.S. PATENT DOCUMENTS

| | | |
|---|---|---|
| 2002/0138381 A1 | 9/2002 | Tomecek |
| 2002/0152151 A1 | 10/2002 | Baughman et al. |
| 2002/0174047 A1 | 11/2002 | Fernholz |
| 2003/0004851 A2 | 1/2003 | Kiron et al. |
| 2003/0009400 A2 | 1/2003 | Kiron et al. |
| 2003/0009404 A2 | 1/2003 | Kiron et al. |
| 2003/0078867 A1 | 4/2003 | Scott et al. |
| 2003/0093352 A1 | 5/2003 | Muralidhar et al. |
| 2003/0110113 A1 | 6/2003 | Martin |
| 2003/0120575 A1 | 6/2003 | Wallman |
| 2003/0191703 A1 | 10/2003 | Chen et al. |
| 2003/0225662 A1 | 12/2003 | Horan et al. |
| 2003/0225663 A1 | 12/2003 | Horan et al. |
| 2004/0019554 A1* | 1/2004 | Merold et al. ............ 705/37 |
| 2006/0190416 A1* | 8/2006 | Himmelstein ............ 705/80 |
| 2007/0233594 A1* | 10/2007 | Nafeh ............ 705/37 |

OTHER PUBLICATIONS

CheckFree Investment Services, Press Release, Dec. 21, 2003, pp. 1-3.

FPA Journal—The Multiple-Equity Fund Portfolio Investment Strategy, Part 1, Dec. 21, 2003, pp. 1-13.

Stein, et al., Parametric Portfolio Associates, Research Brief, "Overlay Portfolio Management in a Multi-Manager Account", pp. 1-17.

M. Schott, The Tower Group, Inc., 2003, "Chasing CheckFree: Portfolio Management Systems for Multidiscipline Accounts", Jul. 2003, pp. 2-16.

Non-Final Office Action mailed Mar. 30, 2009 for related U.S. Appl. No. 11/618,282 (filed Dec. 29, 2006).

Final Office Action mailed Nov. 16, 2009 for related U.S. Appl. No. 11/618,282 (filed Dec. 29, 2006).

* cited by examiner

SYSTEMS AND METHODS FOR AUTOMATICALLY BACKING OUT BY ORDERS

FIELD OF THE INVENTION

The present invention relates generally to systems and methods for automatically modifying a set of buy orders of an investment account when there is insufficient actual or expected cash to support them.

BACKGROUND OF THE INVENTION

When a portfolio management system processes an investment account trade order consisting of a mix of "sell" orders and "buy" orders, some of the sell orders may be prevented or blocked from being executed for a variety of reasons. Because some of the sell orders may be necessary to generate sufficient cash to fund the buy orders, the blocking of some sell orders may result in insufficient cash for executing all of the buy orders. In this situation, at least some of the buy orders may have to be canceled or reduced in order to generate a trading proposal that can be properly executed based upon the available cash.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 provides a system overview of a portfolio management system, according to an exemplary embodiment of the present invention.

DETAILED DESCRIPTION OF THE INVENTION

Figure 1:
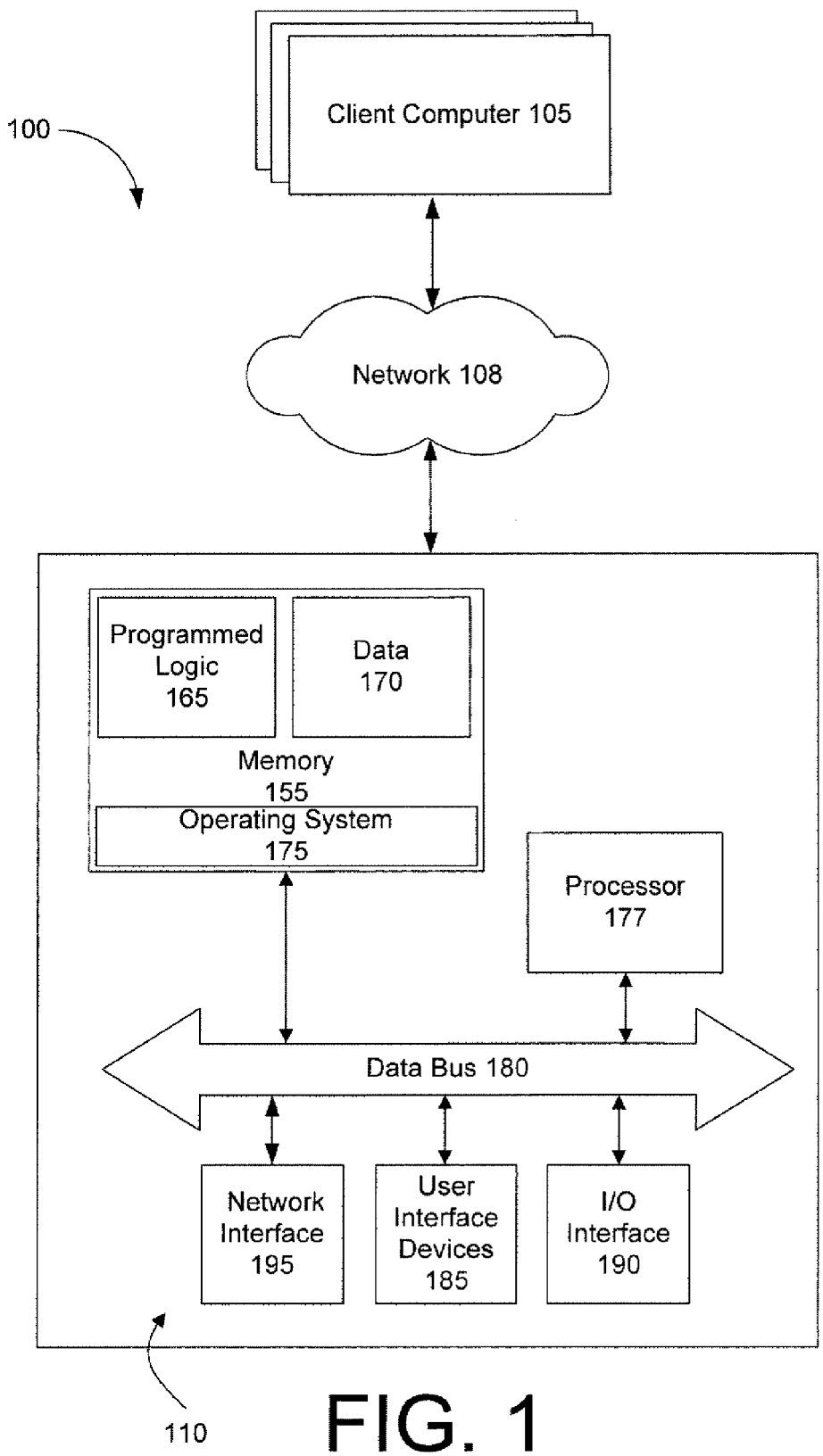

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention is described below with reference to block diagrams of systems, methods, apparatuses and computer program products according to one or more embodiments of the invention. It will be understood that each block of the block diagrams, and combinations of blocks in the block diagrams, respectively, can be implemented by computer program instructions. These computer program instructions may be loaded onto a general purpose computer, special purpose computer, or other programmable data processing apparatus to produce a machine, such that the combination of computing hardware and instructions which execute thereon constitute means for implementing the functionality of each block of the block diagrams, or combinations of blocks in the block diagrams discussed in detail in the descriptions below.

These computer program instructions may also be stored in a computer-readable memory to constitute an article of manufacture. The article of manufacture may be used in conjunction with a computing device to cause the instructions from the article of manufacture to be loaded onto and executed by the computing device, and thereby implement the function specified in the block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

Accordingly, blocks of the block diagrams support combinations of means for performing the specified functions, combinations of steps for performing the specified functions and program instruction means for performing the specified functions. It will also be understood that each block of the block diagrams, and combinations of blocks in the block diagrams, can be implemented by general or special purpose hardware-based computer systems that perform the specified functions or steps, or combinations of general or special purpose hardware and computer instructions.

The inventions may be implemented through one or more application programs running on one or more operating systems of one or more computers. The inventions also may be practiced with diverse computer system configurations, including hand-held devices, multiprocessor systems, microprocessor based or programmable consumer electronics, mini-computers, mainframe computers, and the like.

Application programs may comprise components including modules, objects, data structures, and the like, that perform certain tasks or implement certain abstract data types. A particular application program (in whole or in part) may reside in a single or multiple memories. Likewise, a particular application program (in whole or in part) may execute on a single or multiple computers or computer processors. Exemplary embodiments of the present invention will hereinafter be described with reference to the figures, in which like numerals indicate like elements throughout the several drawings.

Embodiments of the present invention may provide for systems and methods for reducing or canceling buy orders based upon the net available cash for trading in an investment account. As used herein, cash may refer to actual cash, near cash, or cash equivalents, including money market funds, stable principal funds, short-term bonds, interest-bearing instruments, foreign currency, and the like. The reduction or cancellation of buy orders may be referred to as a "back out" or "backing out" of the buy orders. These buy orders may be associated with one or more assets or securities, including stocks, bonds, mutual funds, exchange traded funds (ETFs), exchange traded notes (ETNs), iShares, Treasuries, foreign currency, options and other futures, commodities, and the like. As will be described in further detail below, embodiments of the present invention may provide for flexible and optimized systems and methods for automatically performing such back outs of buy orders.

System Architecture

FIG. 1 is a system overview of a portfolio management system 100 in accordance with an embodiment of the present invention. As shown in FIG. 1, the portfolio management system 100 may include one or more client computers 105 in communication with a control unit 110 via one or more networks 108. The network 108 may include a variety of wired and wireless networks, both private and public, including the Internet, a local area network, a metro area network, a wide area network, a public switched telephone network, or any combination thereof.

Each user computer 105 may include client software (e.g., applet, stand-alone software, a web client, Internet portal) to interface with the control unit 110. The user computer 105 may be operable by a portfolio management system 100 customer, or an employee or representative thereof (for simplicity, hereinafter referred to as the "portfolio management system 100 customer"). The portfolio management system 100 customer may be an investment services firm or company, including but not limited to one or more sponsors or broker/dealers. The portfolio management system 100 customer may utilize the user computer 105 to provide data to and/or receive data from the control unit 110. According to an embodiment of the present invention, the user computer 105 may transmit or otherwise provide one or more buy or sell orders for modification, cancellation, and/or execution by the control unit 110. The user computer 105 may also be operative to provide parameters, prioritizations, and/or scope parameters associated with one or more of the exemplary back out methods to the control unit 110 in accordance with an embodiment of the present invention.

Still referring to FIG. 1, there is a control unit 110 utilized by a portfolio management system 100 for implementing one or more exemplary backing out methods described herein, or combinations thereof, according to one or more illustrative embodiments of the present invention. The control unit 110 may include a memory 155 that stores programmed logic 165 (e.g., software) in accordance with an embodiment of the present invention. The programmed logic 165 may include one or more modules for executing back out methods, or combinations thereof, in accordance with embodiments of the present invention. Accordingly, the programmed logic 165 may include one or more modules for executing one or more of the following back out methods described herein in accordance with embodiments of the present invention: (i) the Best Fit method, (ii) the Random method, (iii) the Pro-rate method, (iv) the Order of Descending Quantity method, (v) the Order of Ascending Quantity method, and (vi) the Factor of Safety method.

The memory 155 may also include data 170 that may be utilized in the operation of the present invention and an operating system 175. The data 170 may include one or more candidate or proposed buy or sell orders, as well as a history of one or more executed, canceled, and/or modified buy or sell orders. The data 170 may further include parameters, prioritizations, and/or scope attributes associated with one or more of the back out methods described herein. A processor 177 may utilize the operating system 175 to execute the programmed logic 165, and in doing so, may also utilize (e.g., store, modify, and/or retrieve) the data 170.

A data bus 180 may provide communication between the memory 155 and the processor 177. Users may interface with the control unit 110 via a user interface device(s) 185 such as a keyboard, mouse, control panel, display, microphone, speaker, or any other devices capable of communicating information to or from the control unit 110. The control unit 110 may be in communication with other external devices via I/O Interface(s) 190, such as one or more printers, facsimiles, tape drives, disk drives, and other external storage devices. Additionally, the control unit 110 may include one or more network interface(s) 195 for communication with the network 100, including user computer 105. Likewise, other network interface(s) 195 may provide communications with networks other than network 100. Further the control unit 110 and the programmed logic 165 implemented thereby may comprise software, hardware, firmware or any combination thereof The control unit 110 may be a personal computer, mainframe computer, minicomputer, any other computer device, or any combination thereof without departing from embodiments of the present invention.

Operational Overview

In accordance with an embodiment of the present invention, the portfolio management system 100 may be operative to provide a plurality of flexible methods to automatically back out candidate or proposed buy orders based upon the actual or expected net amount of available cash for trading in an investment account. In particular, one or more of the candidate or proposed buy orders may need to be reduced or canceled in accordance with one or more of the exemplary back out methods to match the actual or expected amount of net available cash for trading in at least one investment account. As will be individually described below, these exemplary back out methods may be one or more of the following: (i) Best Fit method, (ii) Random method, (iii) Pro-Rate method, (iv) Order of Descending Quantity method, (v) Order of Ascending Quantity method, and (vi) Factor of Safety Method.

According to an embodiment of the present invention, the portfolio management system 100 may be operative to support the customer selection of at least one of the back out methods for at least one investment account associated with the client. Indeed, the portfolio management system 100 customer may scope different back out methods for each client's different investment accounts, or for different groups of investment accounts, defined, for example, by style, strategy, or program. A "style" may identify a particular money manager that manages investment accounts according to a particular investment objective (e.g., growth). A "strategy" may identify a particular investment objective (e.g., growth, income, etc.), irrespective of money manager. A "program" may identify a particular product being offered to investors, which may encompass a plurality of strategies and/or styles. Likewise, the portfolio management system 100, and in particular the control unit 110, may provide one or more methods (e.g., default) for determining which of the exemplary back out methods to apply. If multiple values apply in a given situation, the portfolio management system could prioritize and select the right back out method to utilize.

According to an embodiment of the present invention, scope attributes, which may also be referred to as scopes of applicability, may be specified by the portfolio management system 100 and/or the portfolio management system 100 customer for the exemplary back out methods described herein. These scopes, as represented by scope attributes, may be may be as granular as an individual investment account. In other words, a scope may indicate that a particular back out method only applies to a particular one of the portfolio management system 100 customer's investment accounts. However, a scope may alternatively be as all-encompassing as all of the portfolio management system's investment accounts. According to yet another embodiment of the present invention, intermediate scopes may also be available. For example, an exemplary back out method may apply to all of an portfolio management system 100 customer's investment accounts associated with a particular investment style, a particular investment strategy, or a particular program.

Given that an individual investment account may be associated with one or more of an investment style, an investment strategy, a program, and a client, it may be possible that more than one back out method may be identified as being applicable. This may be the case if, for example, a first scope attribute provides a first back out method for a first investment account while a second scope attribute provides a second back out method for an investment style, where the investment style is associated with the first investment account. In this case, the portfolio management system 100 may have to select, perhaps automatically, a back out method based on a prioritization scheme between or among a plurality of scopes. According to one aspect of the present invention, the prioritization scheme may be determined on the basis of granularity of applicability of scopes. That is, a back out method associated with a more granular scope of applicability may take priority over a less granular scope of applicability.

According to an embodiment of the present invention, the scopes of applicability from most granular scope to least granular scope may include the following:

1. Investment Account (e.g., one of a client's particular investment accounts, including separately managed accounts (SMAs), IRAs, taxable accounts, educational savings account, stock and/or mutual fund wrap accounts, multi-strategy portfolio accounts, Unified Managed Accounts (UMAs), 401(k) or other retirement accounts, etc.)
2. investment Style (e.g., a particular money manager that manages investment accounts according to a particular investment objective (e.g., growth))
3. Investment Strategy (e.g., a particular investment objective such as growth, income, tax minimization, irrespective of money manager.)
4. Program (e.g., a particular product being offered to investors, which may encompass a plurality of strategies and/or styles)
5. Client (e.g., a particular portfolio management system 100 customer having one or more investment accounts)

Based upon the scopes of applicability described above, a back out method associated with an investment account may take priority over a back out method associated anything else (e.g., investment style, investment strategy, program, client).

On the other hand, a back out method associated with the portfolio management system 100 customer may yield to any back out method associated with any other (finer) level of granularity (e.g., program, investment strategy, investment style, investment account). It will be appreciated that the scopes of applicability could be prioritized other than that presented above, and further, the prioritizations could include alternative and other scopes of applicability as well.

In addition, certain parameters (such as the "decrement lots by" amount and rounding method described in further detail below), which may apply uniformly across all investment accounts according to an exemplary embodiment could also be scoped and resolved similarly as described above. For example, a first scope attribute may provide a parameter for an investment style while a second scope attribute may provide another parameter for a program. If an investment account is associated with both the aforementioned investment style and program, then the portfolio management system 100 may have to prioritize between two parameters. As described above, if more granular scopes of applicability have of a higher priority than less-granular scopes of applicability, then the parameter associated with the investment may be selected over the parameter associated with the program.

It will be appreciated that another prioritization scheme and associated scopes of applicability may also be applied in the event that one back out method is not able to successfully modify or cancel one more buy orders to match the level of available cash. According to one embodiment, if the portfolio management system 100 previously selected one of a plurality of applicable back out methods according to scopes of applicability, then the next back out method of a less granular scope may be utilized. According to another embodiment of the present invention, there may be alternative back out methods provided for the same scope of granularity (e.g., a portfolio management system 100 customer specifies "Best Fit" as its preferred method for all investment accounts, and "Pro-Rate" as a secondary method for the same scope). For example, the portfolio management system 100 and/or portfolio management system 100 customer may specify one or more prioritized lists of back out methods to utilize if one or more back out methods are unsuccessful. According to yet another embodiment, one or more other back out methods may be selected randomly if a back out method is unsuccessful.

According to still another embodiment more than one back out method may be executed concurrently, whereby the first valid modified buy order to be generated may be proposed. According to yet another embodiment of the present invention, several back out methods may be used to propose modified buy orders, with a selection between or among the proposed modified buy orders being performed manually based on human decision. Alternatively, the selection may be performed automatically based upon statistical analysis, perhaps with the modified buy order with the lowest deviation from the original buy order. Many other variations will be recognized by one of ordinary skill the art.

Back Out Methodology Overview

Figure 2:
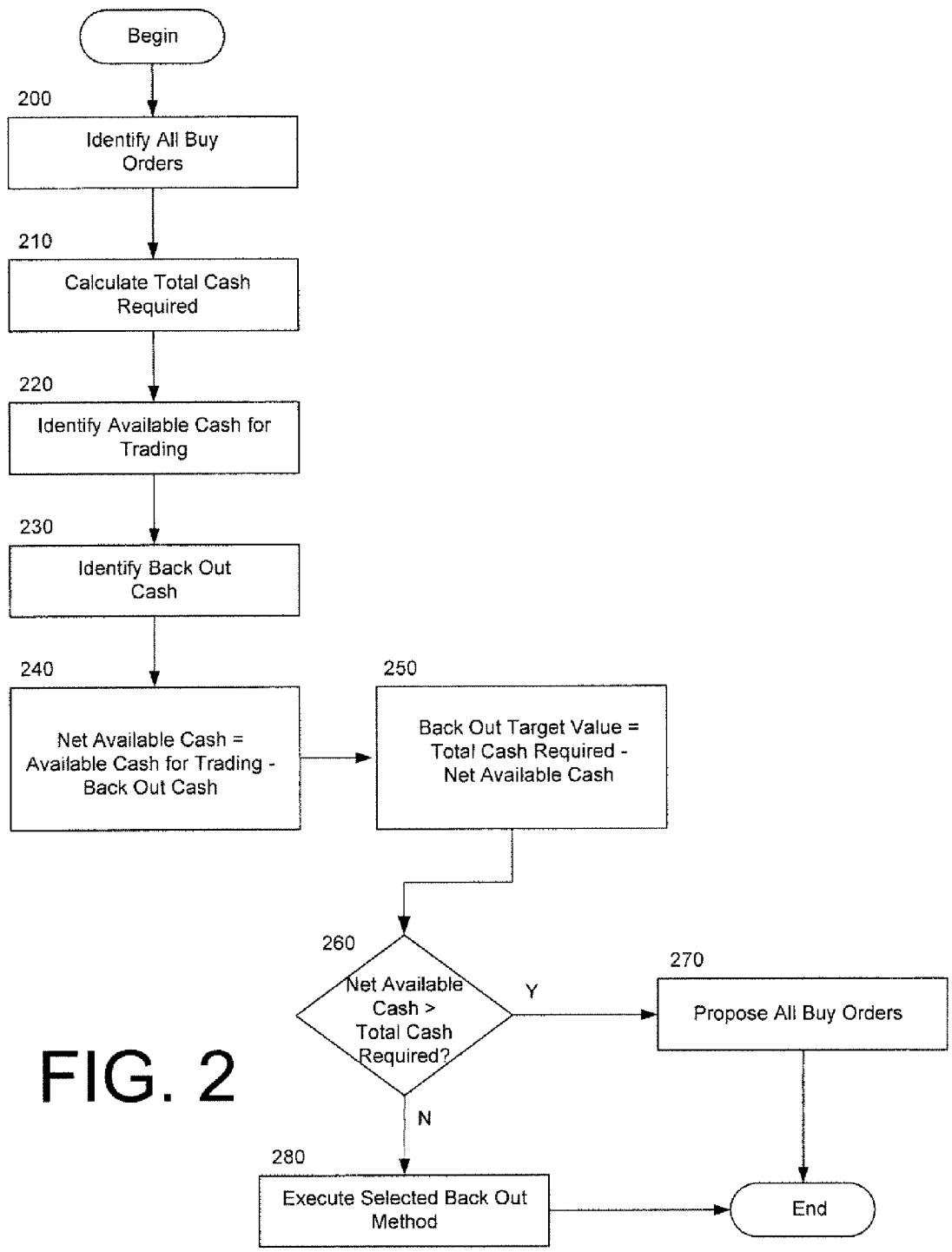
FIG. 2 illustrates the processing flow of a preparatory set-up for an exemplary back out method, according to an embodiment of the present invention.

The back out methods in accordance with embodiments of the present invention will now be discussed generally with respect to FIGS. 2 and 3. FIG. 2 illustrates the processing flow of a preparatory set-up for an exemplary back out method, according to an embodiment of the present invention.

In step 200 of FIG. 2, the portfolio management system 100 may identify the candidate or proposed set of buy orders in the investment account trade order being processed. In step 210, the total cash required to support all of these buy orders may be calculated, which will be described in further detail below with respect to FIG. 3. It will be appreciated that variations are available for determining the total cash required (e.g., the market value) for the buy orders. In step 220, the available cash for trading in the investment account may be identified. The cash available in one or more cash "buckets" associated with the investment account may fluctuate through the course of a day as a function of trading activity and/or withdrawals and deposits. For example, the cash bucket may be in the form of actual cash, money market funds, available margin, short-term bonds, and the like, which may be increased (e.g., credited) or decreased (e.g., debited) based upon trading activity and/or withdrawals and deposits. Optionally, the cash bucket may also include anticipated proceeds associated with one or more sell orders. In step 230, the portfolio management system 100 may identify back out cash—that is, restricted cash or a cash reserve—associated with the investment account. Back out cash may be a cash reserve that takes into account any of a variety of stipulations and restrictions, whether permanent or temporary, including minimum cash requirements, restricted cash, and the like. According to an embodiment of the present invention, back out cash could be $0 if there are no restrictions on the cash.

In step 240, net available cash may be calculated as the difference between the available cash for trading (identified in step 220) and back out cash (identified in step 230). Net available cash may refer to cash that is actually available to support the candidate or proposed set of buy orders. In step 250, the back out target value, or cash amount of buy orders that must be "tacked out," may be calculated as the difference between the total cash required (calculated in step 210) and the net available cash (calculated in step 240). Stated differently, the back out target value may be the amount that must be recovered from backing out of trade orders in order for there to be sufficient net available cash to support the buy orders.

In step 260, a test may be performed to determine if the net available cash is greater than or equal to the total cash required. Alternatively, this test may be performed based upon the back out target value calculated in step 250. For example, if the net available cash is greater than or equal to the total cash required, then the back out target value may be negative or zero. Accordingly, as an alternative for step 260, a negative or zero value for the back out target value may indicate sufficient net available cash while a positive value for the back out target value may indicate insufficient net available cash. Other variations for step 260 are available according to other embodiments of the present invention.

Still referring to step 260, if the net available cash is greater than the total cash required, then in step 270, then all the candidate buy orders can be proposed as is, and no backing out is necessary. If not, then backing out is required, and processing continues with step 280, in which at least one selected back out method is executed in accordance with an embodiment of the present invention. The selected back out method may or may not be able to generate a satisfactory trading proposal (e.g., a trading proposal in which the net available cash is greater than or equal to the total cash required for buy orders). According to an embodiment of the present invention, if the selected back out method does not come up with a satisfactory trading proposal, then another back out method may be executed in accordance with the back out methods prioritization scheme and scopes of applicability discussed above. For example, if the best fit method does not yield a satisfactory method, then another back out method such as the random method may be utilized. It will be appreciated that the following six exemplary back out methods may be ordered or prioritized by the portfolio management system 100 and/or portfolio management system 100 customer, and perhaps in accordance with various scopes of applicability: (i) Best Fit method, (ii) Random method, (iii) Pro-Rate method, (iv) Order of Descending Quantity method, (v) Order of Ascending Quantity method, and (vi) Factor of Safety Method.

Figure 3:
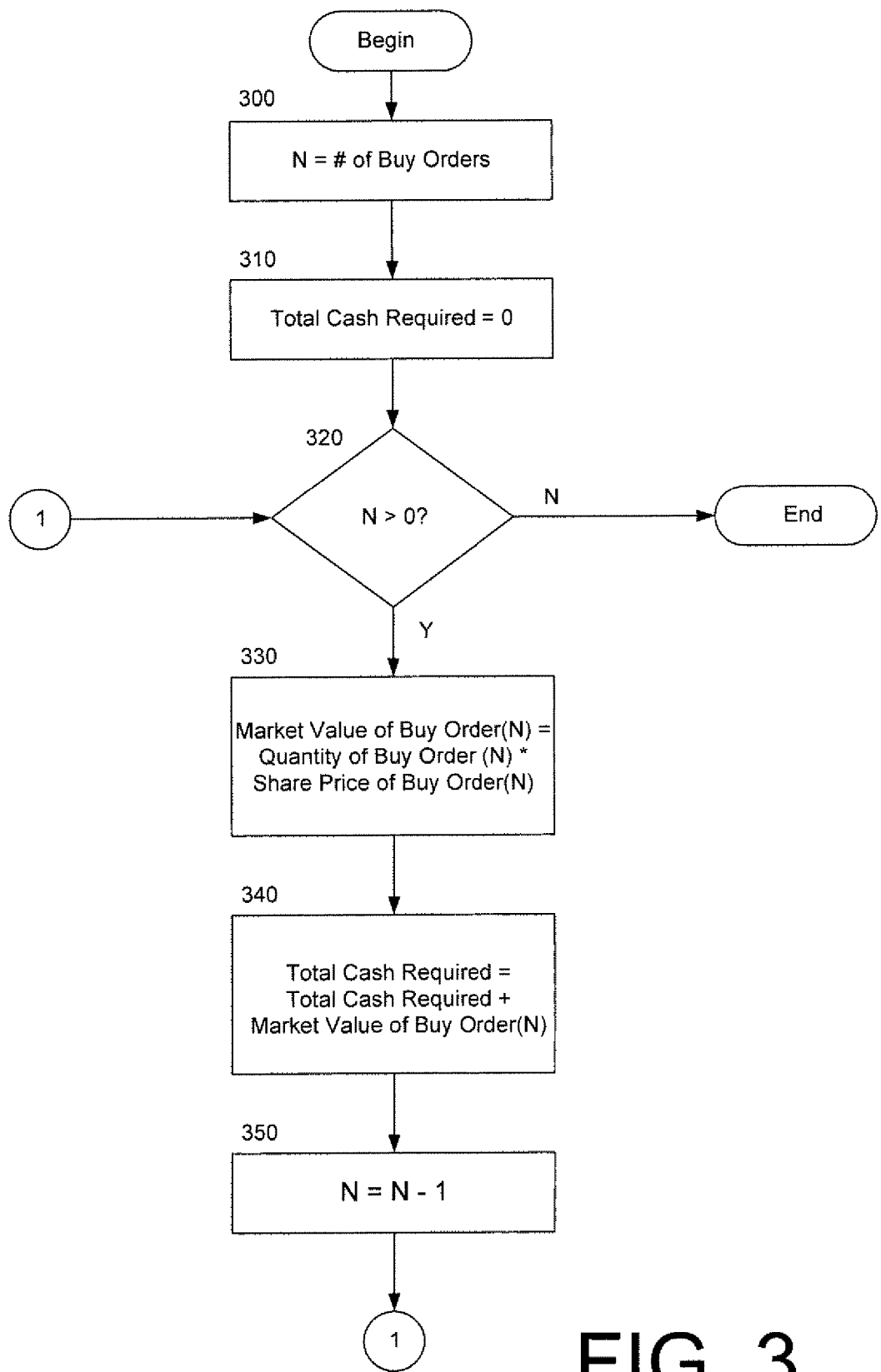
FIG. 3 illustrates the calculation of the total cash required for a candidate or proposed set of buy orders, according to an exemplary embodiment of the present invention.

FIG. 3 illustrates the details the processing of step 210 of FIG. 2—that is, the calculation of the total cash required for the candidate or proposed set of buy orders. According to an embodiment of the present invention, the processing of step 210 may be performed by an exemplary processing loop that sums up the value of all the buy orders identified in step 200. In particular, in step 300, an iteration limit (N) may be set to the number of buy orders being considered or proposed. This iteration limit (N) may specify the number of buy orders that need to be valued and accumulated. In step 310, an accumulator value for total cash required may be initialized (e.g., set to 0). Then the loop executes between steps 320 and 350 described in further detail below, thereby accumulating the market value of each of the proposed buy orders. It will be appreciated, however, that various other methods may be utilized for calculating the total cash (e.g., parallel processing, variations in loop structure, etc.) without departing from embodiments of the present invention.

Step 320 may determine if the iteration limit has been reached (e.g., by having N decremented down to zero). In other words, step 320 determines whether all buy orders have been processed. If so, processing is finished since a market value has been calculated for each buy order and the sum of the market value of all the proposed buy orders may be in the total cash required accumulator. If the iteration limit has not been reached, processing may continue with step 330.

In steps 330 and 340, the Nth buy order is processed, where the Nth buy order may be one of the N numbers of buy orders being considered or proposed. First, in step 330, the market value of the Nth buy order may be calculated as the product of the quantity associated with this buy order (e.g., the number of shares or other units of a security) and the share price of the security associated with this buy order. The share price may be a current intra-day share price according to an exemplary embodiment of the present invention. Alternatively, the share price may be a last share price, an expected share price, or a net asset value (NAV) per share, perhaps in the situation where intra-day share prices are not available (e.g., mutual funds). Then, in step 340, this calculated market value of the Nth buy may be added or otherwise accumulated to the total cash required accumulator. Note that one or more of these values described herein (e.g., the market value of the Nth buy order determined in step 330 and the total cash required determined in step 340) may be retained for subsequent processing. Then the iteration limit may then be decremented in step 350, thereby indicating the completed processing of another buy order, and processing continues back at the top of the loop in step 320 for any remaining unprocessed buy orders. It will be appreciated that other alternatives for calculating the total cash required are available without departing from embodiments of the present invention.

Exemplary Back Out Methods

In accordance with an embodiment of the present invention, a variety of exemplary back out methods that may be executed for step 280 of FIG. 2 will now be discussed in further detail. As introduced above, these exemplary back out methods may include one or more of the following: (i) the Best Fit method, (ii) the Random method, (iii) the Pro-Rate method, (iv) the Order of Descending Quantity method, (v) the Order of Ascending Quantity method, and (vi) the Factor of Safety Method. Each of these exemplary back out methods will now be discussed below in the order presented above.

i. Best Fit Method

Figure 4:
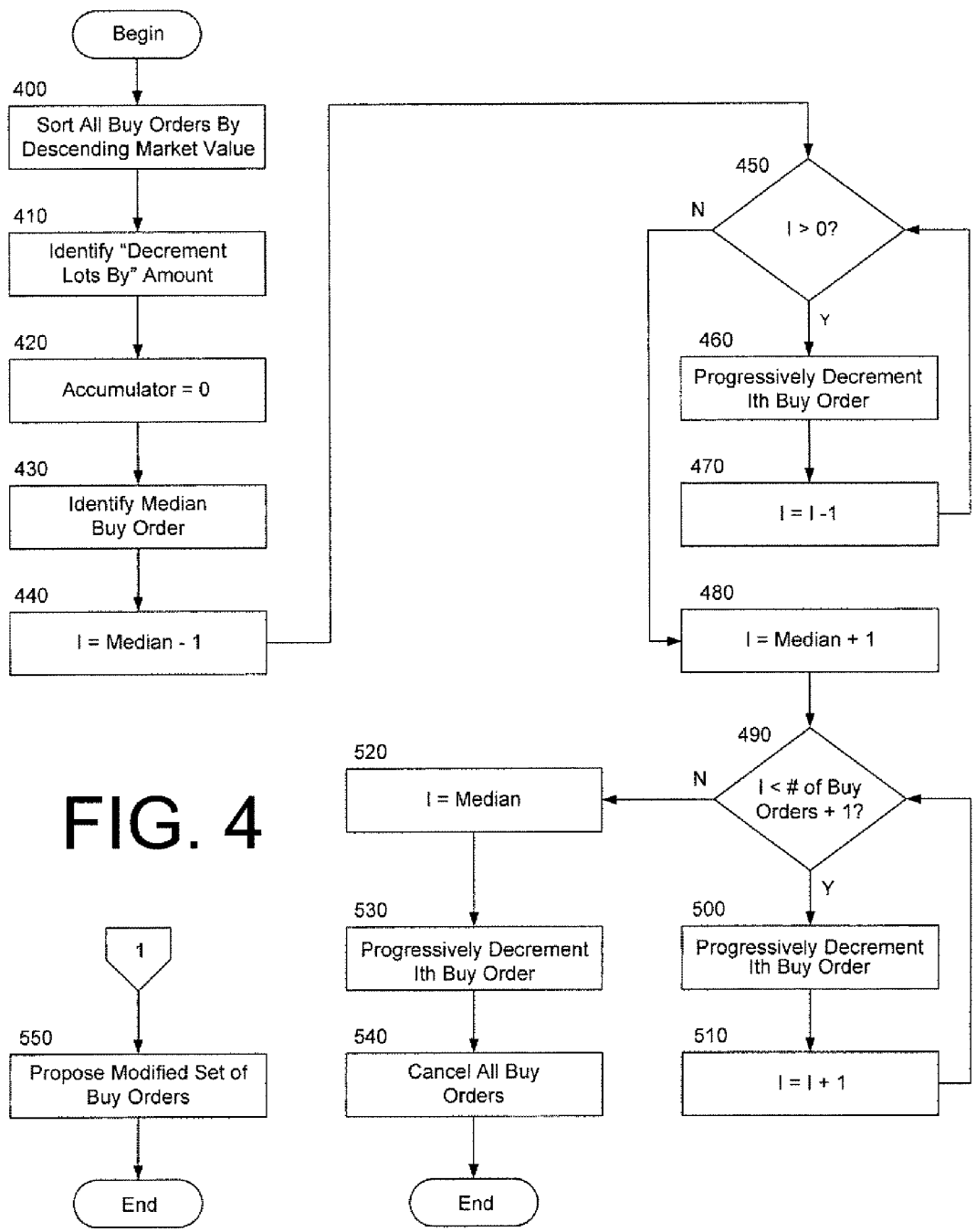
FIG. 4 illustrates an exemplary flow diagram of a best fit method of performing back outs, according to an embodiment of the present invention.

FIG. 4 illustrates an exemplary flow diagram of a best fit method, according to an embodiment of the present invention. Referring to FIG. 4, in step 400, all the candidate or proposed buy orders identified in step 200 of FIG. 2 may be sorted according to market value, perhaps in order of descending market value (or alternatively, ascending market value). According to an alternative embodiment of the present invention, if the proposed buy orders in step 200 are ordered in ascending market value, then a larger number of buy orders may ultimately be canceled according to the best fit method described herein since the smaller market-value buyer orders are decremented before the larger market-value buy order.

Still referring to FIG. 4, the market value of each buy order may have been calculated previously, perhaps in step 330 of FIG. 3, and retained. In step 410, the amount by which to decrement quantities (e.g., lots) (which may also be referred to as a "decrement lots by" amount) may be identified. According to an exemplary embodiment of the present invention, the amount by which to decrement lots may be a discrete amount (e.g., 1, 5, 25, 100, etc.). This amount can be chosen by the portfolio management system 100 customer or set as a default by the portfolio management system 100. If chosen by the portfolio management system 100 customer, it could be scoped to a particular set of investment accounts, as with the back out method. If multiple "decrement lots by" amounts apply in a given processing situation, the portfolio management system 100 may prioritize and select the desired one to use as described herein.

In step 420, an accumulator (to hold an indication of the recovered cash) may be initialized (e.g., set to 0). In step 430, the median instance buy order may be identified (e.g., if there are 5 buy orders, the median instance is the 3rd one). If there is an even number of buy orders, then the median instance buy order may be selected from one of the two middle buy orders according to an exemplary embodiment of the present invention.

The best fit method may then proceed to first process, perhaps serially, the buy orders above the median instance (i.e., ones with a greater market value than the median), stopping as soon as cash at least equal to the back out target value has been recovered. In step 440, the buy order instance that is one above the median may be identified as indicator I. Note that indicator I may also control iterations of a loop between steps 450 and 470.

Step 450 then may check determine if all the buy order instances above the median have been exhaustively processed. If not, the Ith buy order may be processed in step 460. This processing of step 460, described in further detail below, may involve progressively decrementing the quantity by the "decrement lots by" amount (identified in step 410), checking each time if that yields sufficient additional cash to achieve the back out target value. If the Ith buy order is fully processed without yet achieving the objective (i.e., the back out target value), then in step 470, indicator I may be decremented and processing may resume at the top of the loop at step 450.

If all the buy order instances above the median have been fully processed and the back out target value has still not been reached, processing may continue with step 480. In step 480, the buy order instance indicator (still indicator I) is set to one below the median. Indicator I may then become the control for a loop between steps 490 and 510. Step 490 may check to determine if all the buy order instances below the median have been exhaustively processed. If not, a similar Ith buy order processing method as in step 460 (described in further detail below) may be performed in step 500. If the Ith buy order is fully processed without yet achieving the objective (i.e., the back out target value), then in step 510, indicator I may be incremented and processing resumes at the top of the loop at step 490.

If all the buy order instances both above and below the median have been fully processed and the objective still has not been achieved (i.e., the back out target value), then processing may continue with step 520. In step 520, the indicator I is set to the median itself (the very last buy order instance to be evaluated for modification or cancellation). Step 530 may then execute a similar same buy order processing method as in steps 460 and 500, which will be described in further detail below. If the median instance is fully processed without yet achieving the objective, then all buy orders have been processed, and there is nothing further that can be done via this best fit method, and in step 540 all buy orders may be canceled and processing ends. On the other hand, as will be illustrated in the detail of progressively decrementing the Ith buy order, whenever cash at least equivalent to the back out target value has been recovered, processing may jump to step 550, in which the modified set of buy orders may be proposed for execution.

Figure 5:
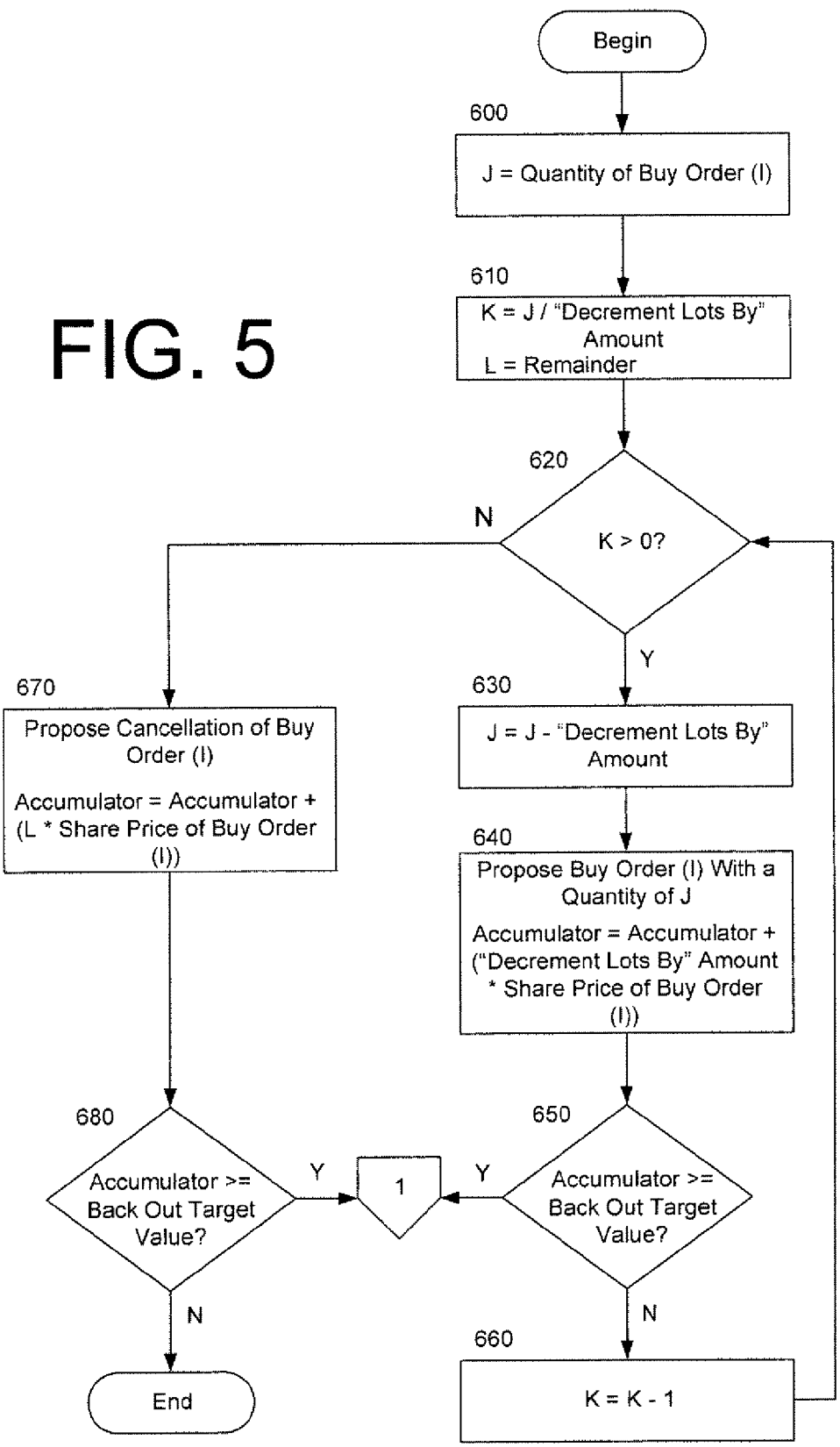
FIG. 5 illustrates an exemplary process for progressively decrementing one or more buyer orders, according to an exemplary embodiment of the present invention.

FIG. 5 illustrates further details of an exemplary process for progressively decrementing one or more buy orders, according to an exemplary embodiment of the present invention. Such a process for progressively decrementing one or more buy orders may be specified by the processing of steps 460, 500, and 530 (from the exemplary Best Fit method of FIG. 4), 760 (from the exemplary Random method, described below with respect to FIG. 6), or 1570 (in Embodiment #3 of the Order of Descending Quantity method, described below with respect to FIG. 11).

In step 600 of FIG. 5, a temporary variable (J) may be set to the quantity of the Ith buy order under consideration. In step 610, a loop counter (K) may be determined as the integer portion of the division of the buy order quantity by the "decrement lots by" amount. The remainder may be saved in another variable (L).

The processing loop for progressively decrementing the quantity may run between steps 620 and 660. Step 620 checks to see if there are any more decrements of the "decrement lots by" amount that can be attempted. If so, processing continues with step 630, in which the temporary variable J is decremented by the "decrement lots by" amount. Then, in step 640, a candidate proposal of the current buy order with the reduced quantity J is created, and the product of the "decrement lots by" amount and the share price of the security associated with the Ith buy order is added to the accumulator. In step 650, the accumulator is (once again) compared to the back out target value. If the accumulator is greater than or equal to the back out target value, the goal (i.e., the back out target value) may have been achieved, and processing can continue with step 550 (in the Best Fit method of FIG. 4), 790 (in the Random method, described below with respect to FIG. 6), or 1590 (in Embodiment #3 of the Order of Descending Quantity method, described below with respect to FIG. 11), in which the modified set of buy orders can be proposed. Otherwise, the loop counter K is decremented in step 660 and processing continues back at the top of the loop in step 620.

After all the full decrements by the "decrement lots by" amount have been completed (and the back out target value still has not been achieved), processing may continue with step 670. In step 670, a candidate proposal of completely canceling the current buy order may be created, and the product of the remainder quantity (L) and the share price of the security associated with the Ith buy order may be added to the accumulator. Then, once again, the accumulator may be compared to the back out target value, in step 680. If the accumulator is greater than or equal to the back out target value, the goal (i.e., the back out target value) has been achieved, and processing can continue with step 550 (in the Best Fit method of FIG. 4), 790 (in the Random method, described below with respect to FIG. 6), or 1590 (in Embodiment #3 of the Order of Descending Quantity method, described below with respect to FIG. 11), in which the modified set of buy orders can be proposed. Otherwise, the processing of the current buy order has reached its end and processing may continue with one of steps 470, 510, or 540 (in the Best Fit method of FIG. 4), 770 (in the Random method, described with respect to FIG. 6), or 1580 (in Embodiment #3 of the Order of Descending Quantity method, described with respect to FIG. 11), as appropriate.

Alternatives to various aspects of this best fit method of FIG. 5 are available, according to other embodiments of the present invention. According to an alternative embodiment, the starting point for determining the first buy order instance (e.g., the median instance) could be the first instance processed, rather than the last one. According to another alternative embodiment, processing could start with a different buy order instance other than an instance around the median instance. For example, processing could start with the largest market value buy order (i.e., first in a sorted list). Or processing could start with the instance that has a market value that is closest to the back out target value (optionally, with the additional stipulation of still being under the back out target value, to ensure at least one buy order is completely canceled, but an excessive amount is not backed out).

According to another alternative embodiment, the parameter defining the amount by which to progressively decrement could be independent of the "decrement lots by" amount parameter. This may be the case where such a "decrement lots by" amount parameter (or an equivalent parameter that could be used for this purpose) may already be in existence for other purposes or other back out methods. For example, this could simply be a different quantity of shares. Or it could be a target value by which to progressively decrement that then gets dynamically converted to an approximately equivalent quantity—i.e., when processing each buy order, the target value could be converted to the closest integer quantity of shares of the associated security, and thus the quantity would vary from buy order to buy order but the value of each decrement would be comparatively more constant.

According to yet another alternative embodiment, instead of processing potentially running through all the buy orders, processing could be capped after a certain number of passes, defined by one or more parameters (e.g., just one limit, or one limit for each of the two "halves" of processing). Such parameters could be established by the portfolio management system 100 customer or set as the portfolio management system 100 defaults. As with other parameters, if chosen by the portfolio management system 100 customer, they could be scoped to particular sets of investment accounts. If multiple values apply in a given situation, the portfolio management system 100 could prioritize and select the right one to use as described herein.

ii. Random Method

Figure 6:
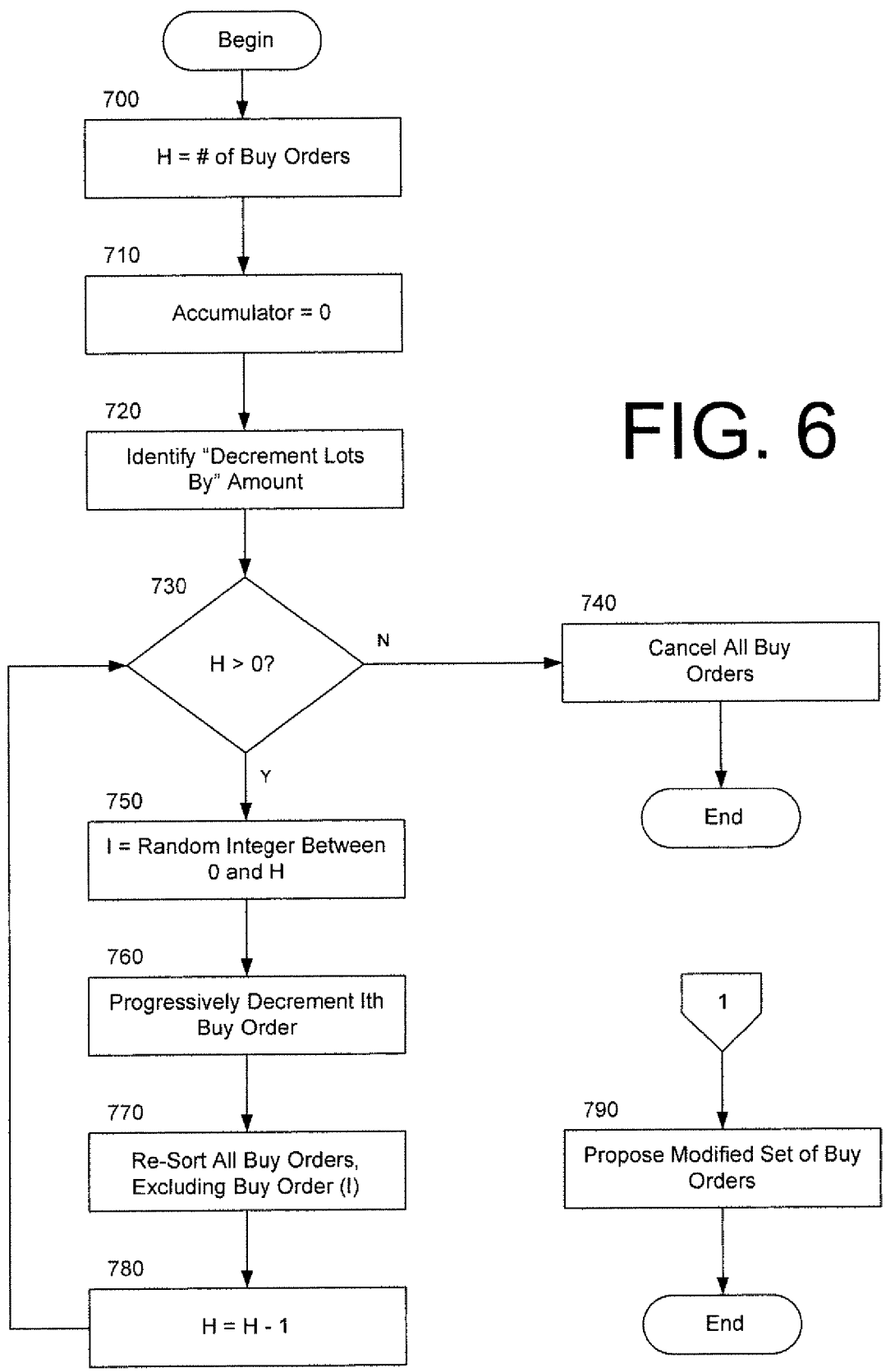
FIG. 6 illustrates an exemplary flow diagram of a random method of performing back outs, according to an embodiment of the present invention.

In accordance with an embodiment of the present invention, the exemplary random method is illustrated in the flow diagram of FIG. 6. In step 700 of FIG. 6, a value H is initially set to the number of buy orders under consideration. The value H may become both an iteration limit for a loop between steps 730 and 780 and an upper bound for generating a random integer. In step 710, an accumulator for cash recovered from progressively decrementing buy orders may be initialized (e.g., set to 0). In step 720, the appropriate amount by which to round quantities (lots) is identified. This amount can be chosen by the portfolio management system 100 customer or set as a default by the portfolio management system 100. If chosen by the portfolio management system 100 customer, it could be scoped to a particular set of investment accounts, as with the back out method, in accordance with an embodiment of the present invention. If multiple "decrement lots by" amounts apply in a given processing situation, the portfolio management system 100 may prioritize the right one to use, as described herein. Then the iterative processing may begin with step 730.

Step 730 may check to determine if the iteration limit has been reached (i.e., all buy orders have been processed). If so, processing is finished, and the goal of backing out cash at least equivalent to the back out target value may not have been achieved. Processing then ends with step 740, in which all buy orders may be canceled. Otherwise, loop processing may continue with step 750.

In step 750, a value I may be set to a random integer between 0 and H, where the value I may be generated by a random number generator. A variety of random number generators are known to those of ordinary skill in the art, including those commonly found on most computer systems. The Ith buy order may then be processed in step 760. This processing, described earlier in FIG. 5 containing steps 600-680, involves progressively decrementing the quantity of the Ith buy order by the "decrement lots by" amount, checking each time if that yields sufficient additional cash to achieve the back out target value. If the back out target value is achieved, processing will return to step 790, in which a modified set of buy orders (containing at least one reduced or even eliminated buy order) is proposed. Otherwise, processing may continue with step 770.

In step 770, the set of buy orders, excluding the just processed (and canceled) Ith one, is resorted. In an embodiment of the present invention, resorting may include simply regrouping the buy orders to eliminate the buy order that was previously processed and canceled. In another embodiment, resorting may further include reordering, perhaps randomly, the remaining buy orders after removing the previously canceled buy order. Then H is decremented (corresponding to the now smaller number of candidate buy orders) in step 780, and processing may resume at the top of the loop in step 730.

Alternatives to various aspects of this disclosed random method of FIG. 6 are available, according to other embodiments of the present invention. According to an alternative embodiment, the parameter defining the amount by which to progressively decrement could be independent of the "decrement lots by" amount parameter. This may be the case where such a "decrement lots by" amount parameter (or an equivalent parameter that could be used for this purpose) may already be in existence for other purposes or other back out methods. For example, this could simply be a different quantity of shares. Or the parameter may be a target value by which to progressively decrement that then gets dynamically converted to an approximately equivalent quantity—i.e., when processing each buy order, the target value could be converted to the closest integer quantity of shares of the associated security, and thus the quantity would vary from buy order to buy order but the value of each decrement would be comparatively more constant.

According to another alternative embodiment, instead of the exemplary process potentially running through all the buy orders, processing could be stopped after a certain number of passes, defined by some parameter. Such a parameter could be established by the portfolio management system 100 customer or set as a system default for the portfolio management system 100. As with other parameters, if chosen by the portfolio management system 100 customer, it could be scoped to a particular set of investment accounts. If multiple values apply in a given situation, the portfolio management system 100 could prioritize and select the right one to use as described herein.

iii. Pro-Rate Method

Figure 7:
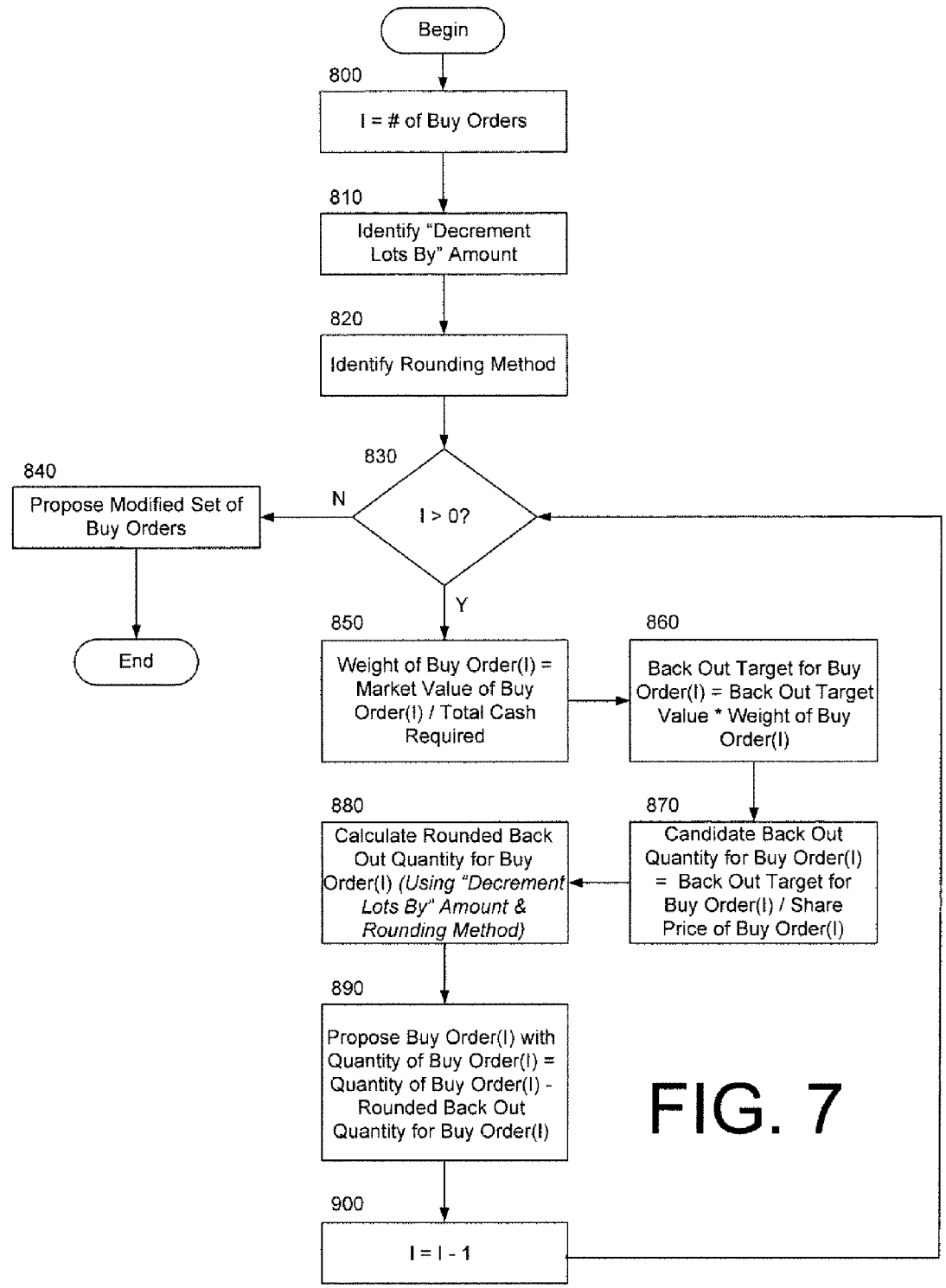
FIG. 7 illustrates an exemplary flow diagram of a pro-rate method of performing back outs, according to an embodiment of the present invention.

FIG. 7 illustrates a flow diagram of an exemplary pro-rate method, according to an exemplary embodiment of the present invention. In step 800, an iteration limit I may be set to the number of buy orders under consideration. In step 810, the amount by which to decrement the quantities (e.g., lots) may be identified and in step 820 the rounding method may be identified. The rounding method may be one of the following, according to an embodiment of the present invention:

1. Up. If the adjusted quantity is between two integer multiples of the "decrement lots by" amount, then increment to the higher integer multiple.
2. Down. If the adjusted quantity is between two integer multiples of the "decrement lots by" amount, then decrement to the lower integer multiple.
3. Nearest. If the adjusted quantity is between two integer multiples of the "decrement lots by" amount, then use the closest integer multiple value.

The value for each of these parameters (e.g., amount by which to decrement the quantities) can be chosen by the portfolio management system 100 customer or set as a default by the portfolio management system 100. If chosen the by portfolio management system 100 customer, a value could be scoped to a particular set of investment accounts, as with the back out method. If multiple values apply in a given processing situation, the portfolio management system 100 could prioritize and select the right one to use as described herein.

The processing loop for modifying all the buy orders to achieve the back out target value runs between steps 830 and 900. Step 830 checks to see if there are any more buy orders to be processed. If there are no more to be processed, then the modified set of buy orders is proposed in step 840 and processing ends. Otherwise, processing may continue with step 850.

In step 850, the weight (relative proportion expressed as a percentage) of the current (Ith) buy order is calculated as the ratio of the market value of the buy order to the total cash required for all the buy orders. In step 860, the back out target value for the current buy order may be calculated as the product of the back out target value and the just determined weight of the current buy order. In step 870, the back out target for the current buy order may be converted to a candidate back out quantity (of shares) by dividing the back out target by the share price of the security associated with the current buy order. The candidate quantity determined in step 870 may be unlikely to be a pure integer value, and trades are typically executed in whole (not fractional) shares. Accordingly, in step 880, the candidate back out quantity for the current buy order may be adjusted using the identified "decrement lots by" amount and identified rounding method to produce a rounded back out quantity.

Finally, in step 890, a modified Ith buy order proposal with a quantity reduced by the decremented back out quantity is generated. Then the iteration limit is decremented in step 900 and processing continues back at the top of the loop in step 830.

In accordance with an embodiment of the present invention, the above-described method may generally achieve the objective of backing out at least the total back out target value. However, all buy orders may be affected and none is typically completely eliminated (unless that happens as a result of the decrementing), according to an embodiment of the present invention. In an alternative embodiment of the present invention, step 840 may be modified to determine whether the total cash required has been achieved before proposing the modified set of buy orders. For example, the total cash required might not be achieved where the rounding down method is utilized for the pro-rate method. In this alternative embodiment, the set of buy order may need further modification to achieve the total cash required. Further modification may include may include canceling the buy order entirely or in part, or perhaps adjusting each of the buy orders by a decrement quantity by amount, as described herein.

According to another alternative embodiment, one or more buy orders may be exempted from the pro-rate method. In this situation, the remaining buy orders may have to be backed out to a larger extent to achieve the back out target value. However, it may also be possible that there are not enough buy orders remaining to achieve the back out target value. According to another alternative embodiment, the weight of a particular buy order determined in step 850 may be slightly adjusted or modified from its true weight. In particular, a measure of importance may be assigned to the particular buy orders. Accordingly, an important buy order may be adjusted slightly downwards, resulting in less of back out for that buy order. Likewise, a weight of a more important buy order may be adjusted slightly upwards, resulting in more of a back out for that buy order. The weights of all the buy orders may be adjusted in parallel fashion such that the total weight of all the buy orders still equals 100%. Many other variations of the pro-rate method are possible without departing from embodiments of the present invention.

iv. Order of Descending Quantity Method

Embodiment #1

Figure 8:
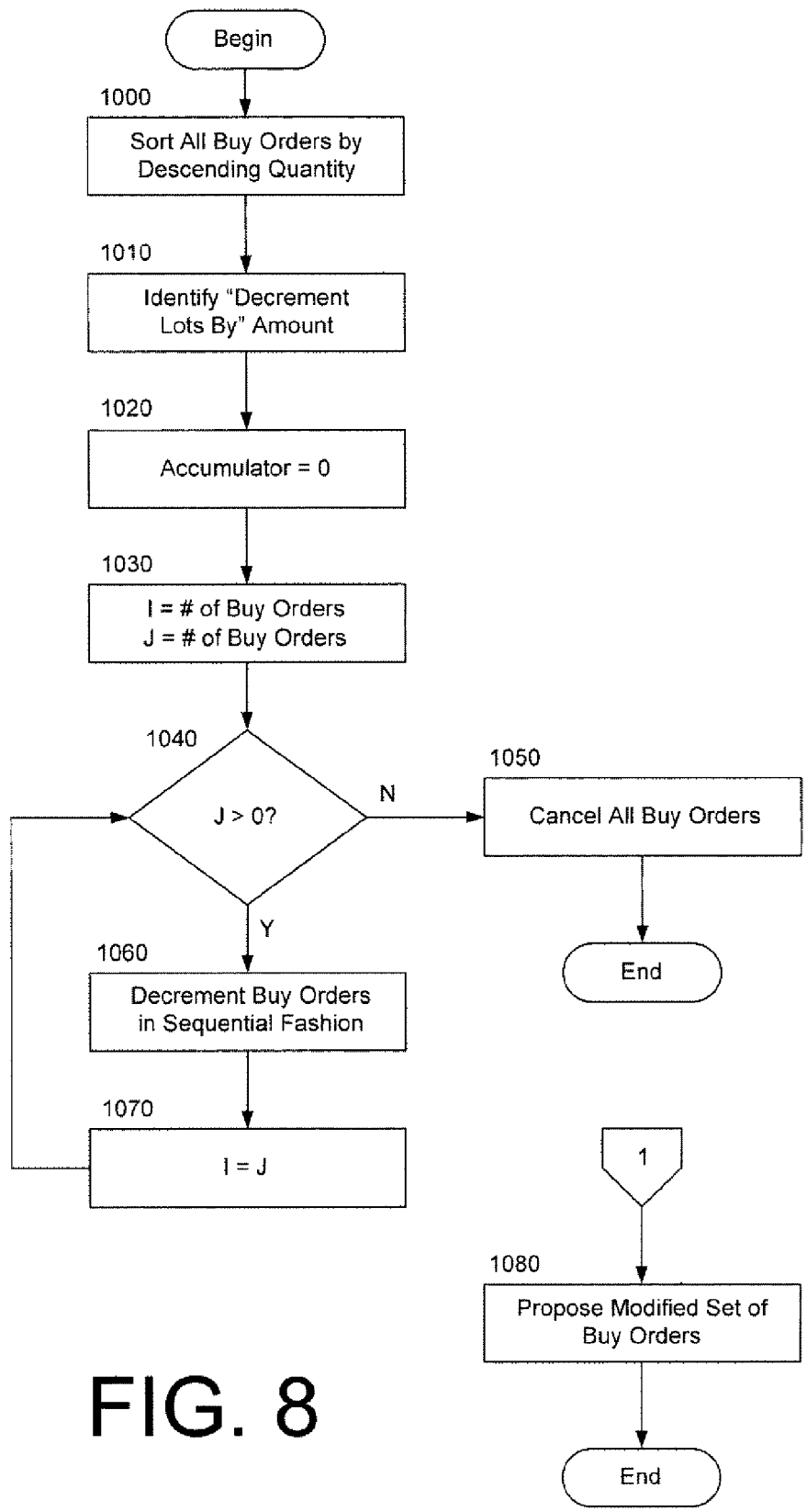
FIG. 8 illustrates an exemplary flow diagram of a first embodiment of the order of descending quantity method, according to an exemplary embodiment of the present invention.

In accordance with an embodiment of the present invention, FIG. 8 illustrates an exemplary flow diagram of a first embodiment of the Order of Descending Quantity method. Generally, with this embodiment of the Order of Descending Quantity method, the candidate set of buy orders may be ordered by descending quantity and processed in a round robin fashion (e.g., as a circular chain), as will be described in further detail below.

In step 1000, the buy orders identified in step 200 may be sorted in order of descending quantity (e.g., based upon a descending quantity of shares in each buy order). In step 1010, the amount by which to decrement the quantities (e.g., lots) is identified. This parameter value may be chosen by the portfolio management system 100 customer or set as a default by the portfolio management system 100. If chosen the by the portfolio management system 100 customer, a value could be scoped to a particular set of investment accounts, as with the back out method. If multiple values apply in a given processing situation, the portfolio management system 100 could prioritize and select the right one to use as described herein.

In step 1020, an accumulator for cash recovered from decrementing buy orders may be initialized (e.g., set to 0). Then, in step 1030, two variables that may be used as iteration limits (I and J) may both be set to the number of buy orders. One of these variables (J) may reflect the number of non-zero quantity buy orders remaining, and may control the outer loop of processing. The other variable (I) may allow non-zero quantity buy orders to be processed in a sequential fashion within one pass of processing.

Step 1040 may then check to determine if there are any non-zero quantity buy orders remaining (e.g., J>0). If there are not, processing may end with step 1050, in which all buy orders may be canceled. Otherwise, processing may continue with step 1060. In step 1060, the set of non-zero quantity buy orders may be sequentially decremented, as will be described in further detail below with respect to FIG. 9. After processing each of the non-zero quantity buy orders, a check may be performed to determine if enough cash has been recovered to achieve the back out target value. If the back out target value is achieved, then processing may return to step 1080, in which a modified set of buy orders, which includes at least one reduced or even eliminated buy order, is proposed. Otherwise, processing may continue with step 1070.

In step 1070, the iteration limit for sequentially processing the set of non-zero quantity buy orders (which has just been decremented to 0 in the processing of step 1060) may be reset to J, the count of the non-zero quantity buy orders. Note that J may have been reduced within the processing of step 1060, which is discussed with respect to FIG. 9. Then processing continues back at the top of the loop in step 1040.

Figure 9:
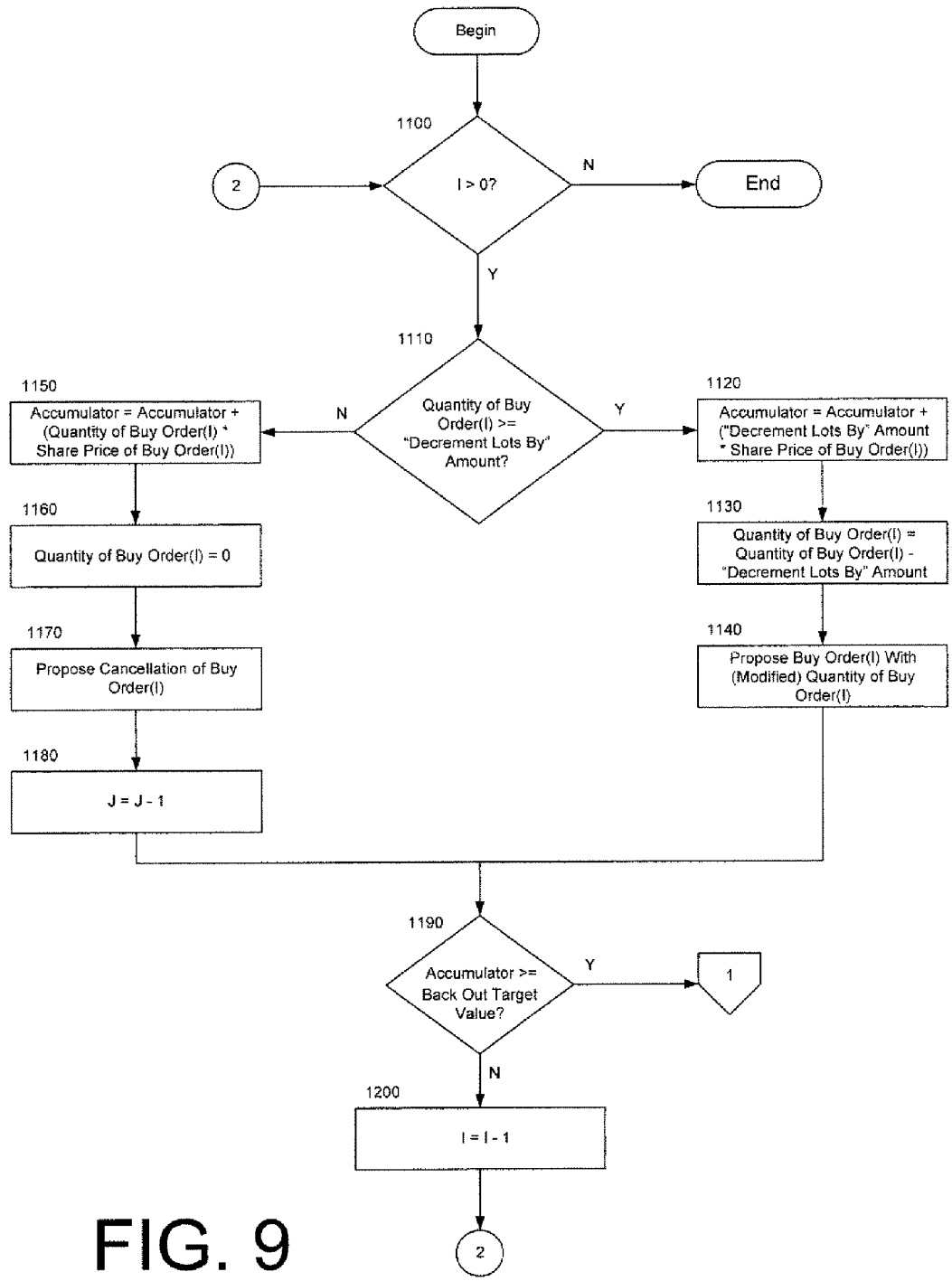
FIG. 9 illustrates an exemplary flow diagram for decrementing buy orders in sequential fashion, according to an exemplary embodiment of the present invention.

FIG. 9 illustrates further details the processing of step 1060 of FIG. 8—that is, the decrementing of buy orders in a sequential (e.g., round robin) fashion. Step 1100 checks if not all the non-zero quantity buy orders have yet been sequentially processed (e.g., I>0). If they have all been processed, then processing ends. Otherwise, processing continues with the current (Ith) buy order in step 1110. Step 1110 checks if the current (potentially already decremented) quantity of the Ith buy order is greater than the "decrement lots by" amount. If it is, processing continues with step 1120.

In step 1120, the product of the "decrement lots by" amount and the share prices of the security associated with the current (Ith) buy order may be added to the accumulator. The current quantity of the Ith buy order is then decremented by the "decrement lots by" amount in step 1130. And then finally, in step 1140, a candidate proposal of the current buy order with the reduced (modified) quantity calculated in step 1130 is generated.

On the other hand, if step 1110 determines that the remaining quantity of the Ith buy order is less than the "decrement lots by" amount, then processing may continue with step 1150. In step 1150, the product of the remaining quantity of the Ith buy order and the share price of the security associated with this buy order may be added to the accumulator. This accumulator keeps a total of the potential cash saved through the reduction or cancellation of one or more buy orders. The current quantity of the Ith buy order may then be set to 0 in step 1160. In step 1170, a candidate proposal to cancel the current buy order may be generated. Then, the count of non-zero quantity buy orders (J) is decremented in step 1180.

After either step 1140 or step 1180, processing may continue with step 1190, in which the accumulator is compared to the back out target value. If the accumulator is greater than or equal to the back out target value, then the goal (e.g., the back out target value) has been achieved, and processing can continue with step 1080, in which the modified set of buy orders can be proposed. Otherwise, the iteration limit I may be decremented in step 1200, and processing continues back at the top of the loop in step 1100.

Alternatives to various aspects of this disclosed method of FIG. 9 are available according to embodiments of the present invention. According to an alternative embodiment, instead of running the processing through until there are no more non-zero quantity buy orders, J could be set equal to some finite limit of processing passes (e.g., 5). This may be a parameter established by the portfolio management system 100 customer or set as a portfolio management system 100 default. As with other parameters, if chosen by the portfolio management system 100 customer, it could be scoped to a particular set of investment accounts. If multiple values apply in a given situation, the portfolio management system 100 could prioritize and select the right one to use as described herein.

According to another embodiment of the present invention, in step 1000, the buy orders may be sorted randomly or in some non-quantity-based order instead of by descending quantity. According to still another alternative embodiment, the parameter defining the amount by which to progressively decrement could be independent of the "decrement lots by" amount parameter. This may be the case where such a "decrement lots by" amount parameter (or an equivalent parameter that could be used for this purpose) may already be in existence for other purposes or other back out methods. For example, this parameter could simply be a different quantity of shares. Or it could be a target value by which to progressively decrement that then gets dynamically converted to an approximately equivalent quantity—i.e., when processing each buy order, the target value could be converted to the closest integer quantity of shares of the associated security, and thus the quantity would vary from buy order to buy order but the value of each decrement would be comparatively more constant.

Embodiment #2

Figure 10:
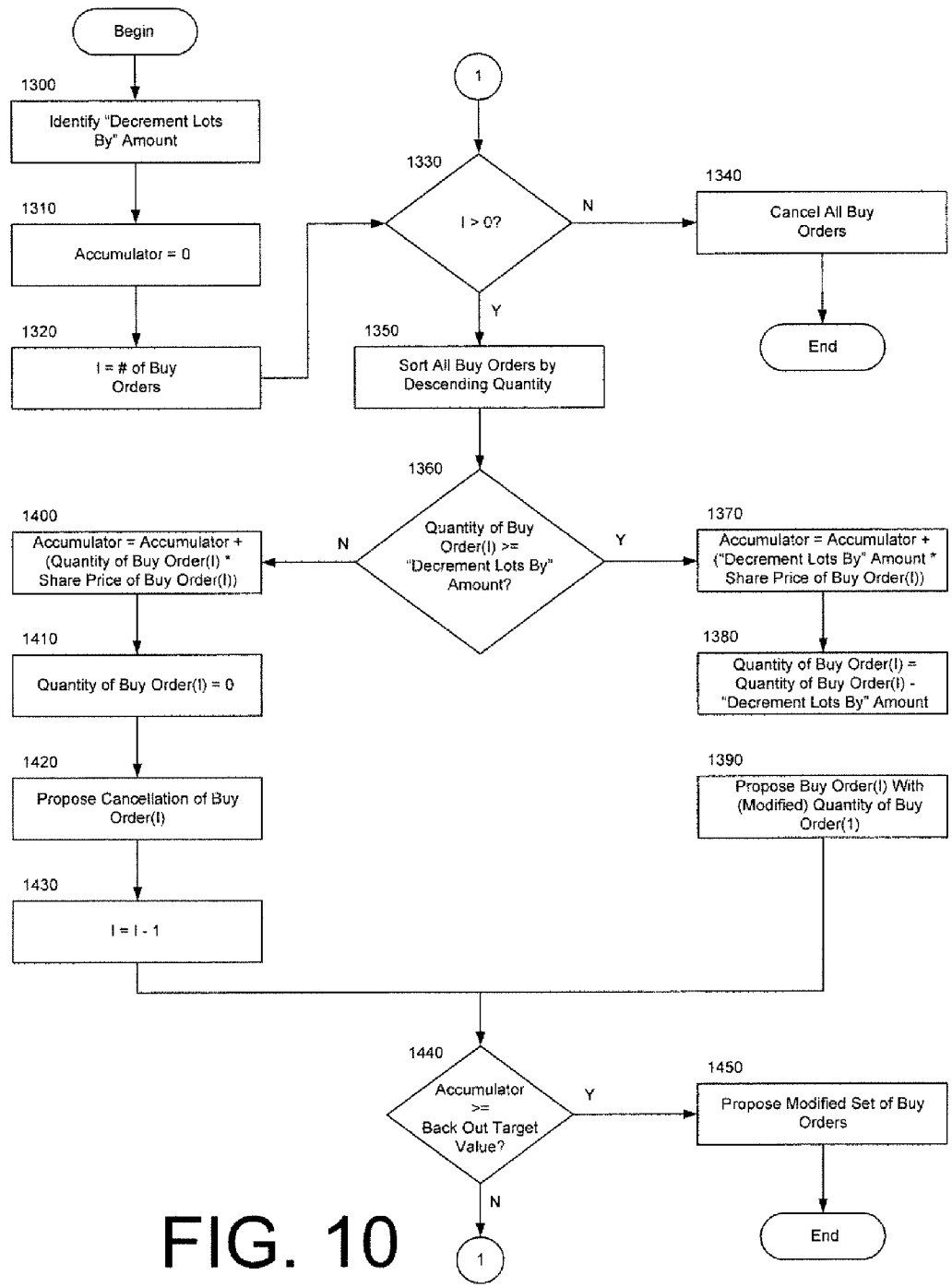
FIG. 10 illustrates an exemplary flow diagram of a second embodiment of the order of descending quantity method, according to an exemplary embodiment of the present invention.

In accordance with an embodiment of the present invention, FIG. 10 illustrates an exemplary flow diagram of a second embodiment of the Order of Descending Quantity method. This second embodiment may decrement from buy orders sorted in descending quantity order by removing from the buy order with the largest quantity. Thereafter, according to this second embodiment, the list of buy orders may be resorted after each decrement.

In step 1300, the amount by which to decrement the quantities (lots) may be identified. This parameter value (e.g., amount by which to round the quantities) may be chosen by the portfolio management system 100 customer or set as a default by the portfolio management system 100. If chosen the by portfolio management system 100 customer, a value could be scoped to a particular set of investment accounts, as with the back out method. If multiple values apply in a given processing situation, the portfolio management system 100 could prioritize and select the right one to use as described herein.

In step 1310, an accumulator for cash recovered from decrementing buy orders is initialized (e.g., set to 0). Then in 1320, an iteration limit may be set to the number of non-zero quantity buy orders. Initially, this number of number of non-zero quantity buy orders may include all the buy orders identified in step 200. A processing loop may then run between step 1330 and 1440.

Step 1330 may check whether there are any more non-zero quantity buy orders (e.g., I>0) If there are not, processing is finished, and the goal of backing out cash at least equivalent to the back out target value has not been achieved. Processing then ends with step 1340, in which all buy orders are canceled. Otherwise, processing continues with step 1350.

In step 1350, the buy orders identified in step 200 are sorted by descending current quantity. Step 1350 will be repeated with each pass of processing in the loop, and will always force the buy order with the largest current quantity to the top of the list. Step 1360 checks if the current (potentially already decremented) quantity of the top buy order—that is, the buy order with the largest current quantity—is greater than the "decrement lots by" amount. If it is, processing may continue with step 1370.

In step 1370, the product of the "decrement lots by" amount and the share prices of the security associated with the current (top) buy order is added to the accumulator. The current quantity of the top buy order is then decremented by the "decrement lots by" amount in step 1380. And then finally, in step 1390, a candidate proposal of the current buy order with the reduced (modified) quantity calculated in step 1380 is generated.

On the other hand, if step 1360 determined that the remaining quantity of the top buy order is less than the "decrement lots by" amount, then processing continues with step 1400. In step 1400, the product of the remaining quantity of the top buy order and the share price of the security associated with this buy order may be added to the accumulator. The current quantity of the top buy order is then set to 0 in step 1410. In step 1420, a candidate proposal to cancel the current buy order is generated. Then, the count of non-zero quantity buy orders (I) may be decremented in step 1430.

After either step 1390 or step 1430, processing continues with step 1440, in which the accumulator is compared to the back out target value. If the accumulator is greater than or equal to the back out target value, the goal has been achieved, and processing can continue with step 1450, in which the modified set of buy orders is proposed. Otherwise, processing continues back at the top of the loop in step 1330.

Alternatives to various aspects of this disclosed Order of Descending Quantity method of FIG. 10 are available according to embodiments of the present invention. According to an alternative embodiment, instead of running the processing through until there are no more non-zero quantity buy orders, I could be set equal to some finite limit of processing passes (e.g., 5). This could be a parameter established by the portfolio management system 100 customer or set as default by a portfolio management system 100. As with other parameters, if chosen by the portfolio management system 100 customer, it could be scoped to a particular set of investment accounts. If multiple values apply in a given situation, the portfolio management system 100 could prioritize and select the right one to use as described herein.

According to another alternative embodiment, the parameter defining the amount by which to progressively decrement could be independent of the "decrement lots by" amount parameter. This may be the case where such a "decrement lots by" amount parameter (or an equivalent parameter that could be used for this purpose) may already be in existence for other purposes or other back out methods. For example, this could simply be a different quantity of shares. Or it could be a target value by which to progressively decrement that then gets dynamically converted to an approximately equivalent quantity—i.e., when processing each buy order, the target value could be converted to the closest integer quantity of shares of the associated security, and thus the quantity would vary from buy order to buy order but the value of each decrement would be comparatively more constant.

Embodiment #3

Figure 11:
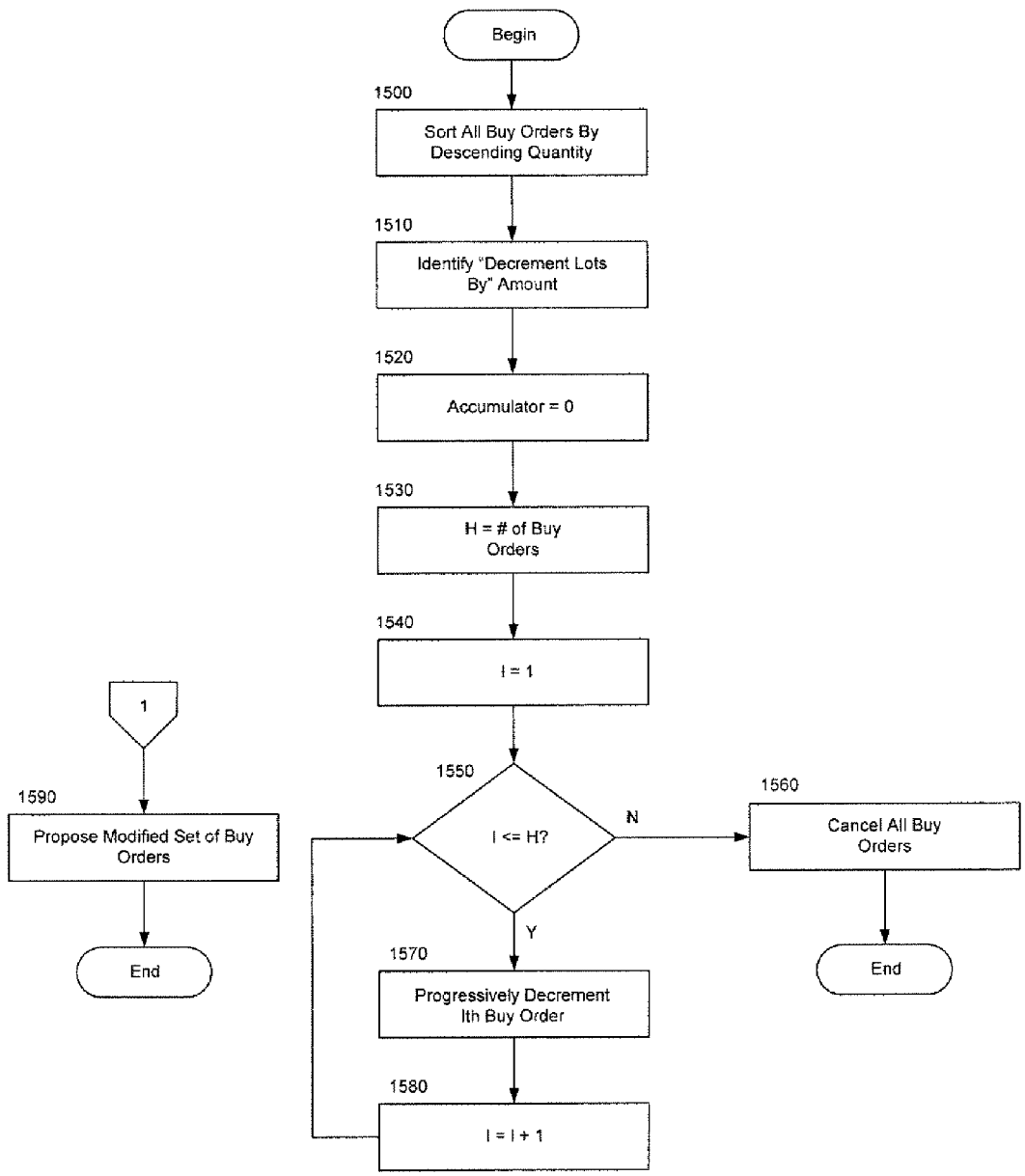
FIG. 11 illustrates an exemplary flow diagram of a third embodiment of the order of descending quantity method, according to an exemplary embodiment of the present invention.

In accordance with an embodiment of the present invention, FIG. 11 illustrates an exemplary flow diagram of a third embodiment of the Order of Descending Quantity method. This third embodiment may decrement from buy orders sorted in descending quantity order by exhaustively decrementing from one buy order before moving to the next one.

In step 1500, all the buy orders identified in step 500 may be sorted in order of descending quantity. In step 1510, the amount by which to round the quantities (lots) may be identified. This parameter value can be chosen by the portfolio management system 100 customer or set as a default by the portfolio management system 100. If chosen the by the portfolio management system 100 customer, a value could be scoped to a particular set of investment accounts, as with the back out method. If multiple values apply in a given processing situation, the portfolio management system 100 could prioritize and select the right one to use as described herein.

In step 1520, an accumulator for cash recovered from decrementing buy orders may be initialized (e.g., set to 0). In 1530, an iteration limit may be set to the number of buy orders under consideration. In step 1540, an indicator of the buy order being processed is set to 1 (initially to point to the first or top one in the list). A processing loop then runs between step 1550 and 1580.

Step 1550 checks if the buy order indicator (e.g., I) is pointing within the set of buy orders (e.g., H). If it is not, then processing ends with step 1560, in which all buy orders are canceled. Otherwise, processing of the Ith buy order continues with step 1570. This processing, described earlier with respect to steps 600-680 of FIG. 5, involves progressively decrementing the quantity of the Ith buy order by the "decrement lots by" amount, checking each time if that yields sufficient additional cash to achieve the back out target value. If the back out target value is achieved, processing will return to step 1590, in which a modified set of buy orders (containing at least one reduced or even eliminated buy order) is proposed. Otherwise, processing may continue with step 1580. In step 1580, the buy order indicator may be incremented and processing may then continue back at the top of the loop, in step 1550.

Alternatives to various aspects of this disclosed method of FIG. 11 are available according to embodiments of the present invention. According to an alternative embodiment, instead of running the processing through until there are no more buy orders, H could be set equal to some finite limit of processing passes (e.g., 5). This could be a parameter established by the portfolio management system 100 customer or set as a portfolio management system 100 default. As with other parameters, if chosen by the portfolio management system 100 customer, it could be scoped to a particular set of investment accounts. If multiple values apply in a given situation, the portfolio management system 100 could prioritize and select the right one to use as described herein.

According to another alternative embodiment, the parameter defining the amount by which to progressively decrement could be independent of the "decrement lots by" amount parameter. This may be the case where such a "decrement lots by" amount parameter (or an equivalent parameter that could be used for this purpose) may already be in existence for other purposes or other back out methods. For example, this could simply be a different quantity of shares. Or it could be a target value by which to progressively decrement that then gets dynamically converted to an approximately equivalent quantity—i.e., when processing each buy order, the target value could be converted to the closest integer quantity of shares of the associated security, and thus the quantity would vary from buy order to buy order but the value of each decrement would be comparatively more constant.

v. Order of Ascending Quantity Method

In accordance with an embodiment of the present invention, the Order of Ascending Quantity method may be substantially similar to the to the Order of Descending Quantity methods described above, except that the buy orders are sorted (and therefore processed) in order of ascending quantity, rather than descending quantity. Accordingly, the 1st and 3rd embodiments described in FIGS. 9 and 11 may be applicable here.

In the case of the 1st embodiment of FIG. 9, one additional step may be required—after each pass through all the non-zero quantity buy orders, the starting point for the next pass would have to be set to the first non-zero quantity buy order.

Alternatives to various aspects of this disclosed method are available according to embodiments of the present invention. Indeed, this method includes the alternatives previously discussed with respect to FIGS. 9-11. Other variations are also available without departing from embodiments of the present invention.

vi. Factor of Safety Method

Figure 12:
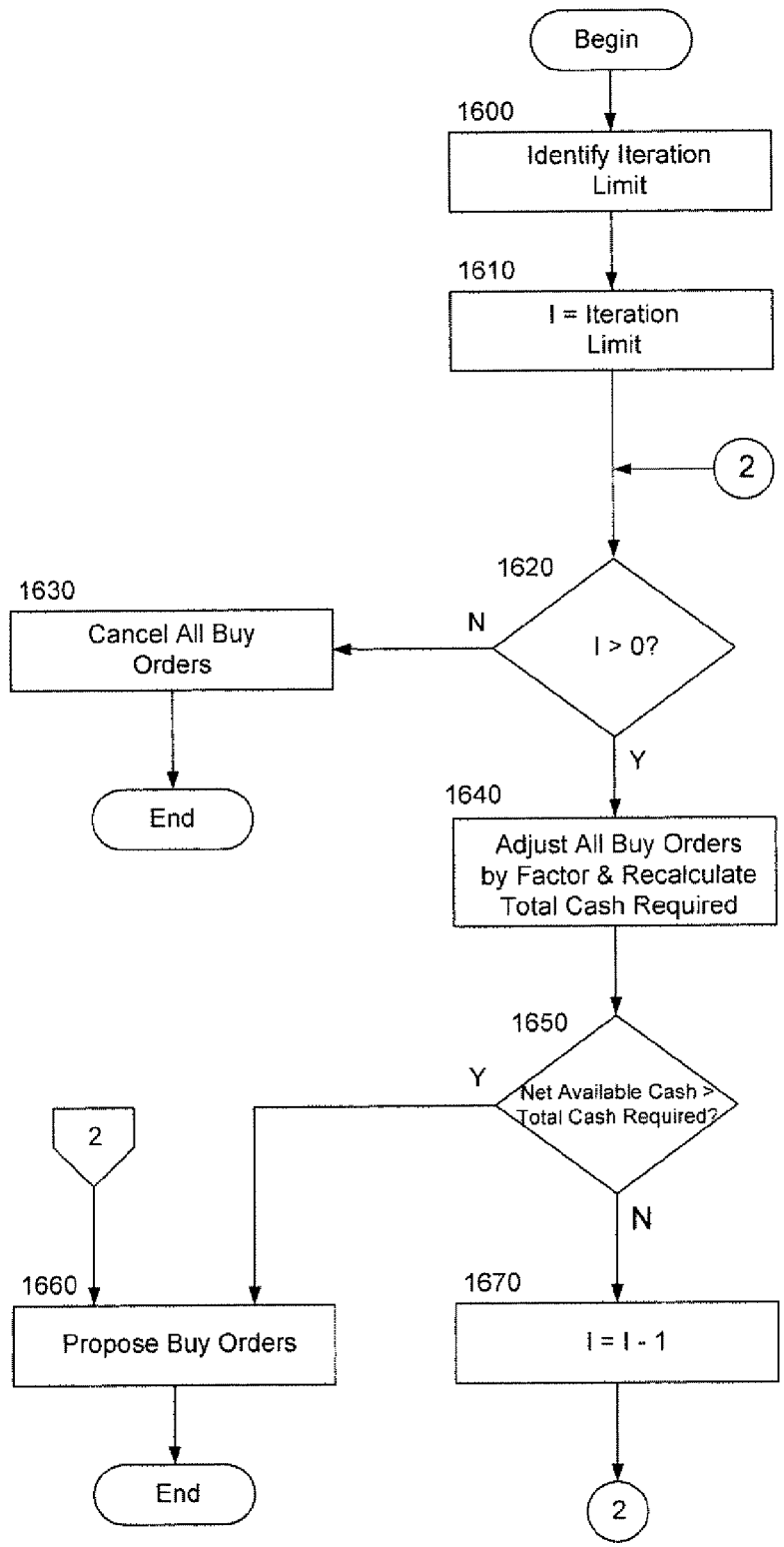
FIG. 12 illustrates a flow diagram of an exemplary factor of safety method.

FIG. 12 illustrates a flow diagram of the factor of safety method. Generally, the factor of safety method may be an iterative process to attempt to back out enough of the buy orders to result in an acceptable proposal. Referring to FIG. 12, steps 1600 and 1610 may establish the number of times the main processing loop will be executed (e.g., an iteration limit). According to an embodiment of the present invention, an iteration limit I may be set to the number of buy orders under consideration.

Steps 1620-1670, then, are elements of the processing loop. Step 1620 may check if the iteration limit has been reached. If the iteration limit has been reached, then the method has not been successful in modifying buy orders by at least the back out target value, and in step 1630, all buy orders are canceled. Otherwise, processing may continue with step 1640.

In step 1640, which will be discussed in further detail with respect to FIG. 13, all the buy orders are adjusted by a "factor", and the total cash required is then recalculated accordingly. In step 1650, net available cash is compared to this new total cash required. If the net available cash is greater than the new total cash required, then, in step 1660, the adjusted buy orders can be proposed (the back out target value has been satisfied). Otherwise, the iteration limit is decremented in step 1670 and the loop processing continues with step 1620.

Figure 13:
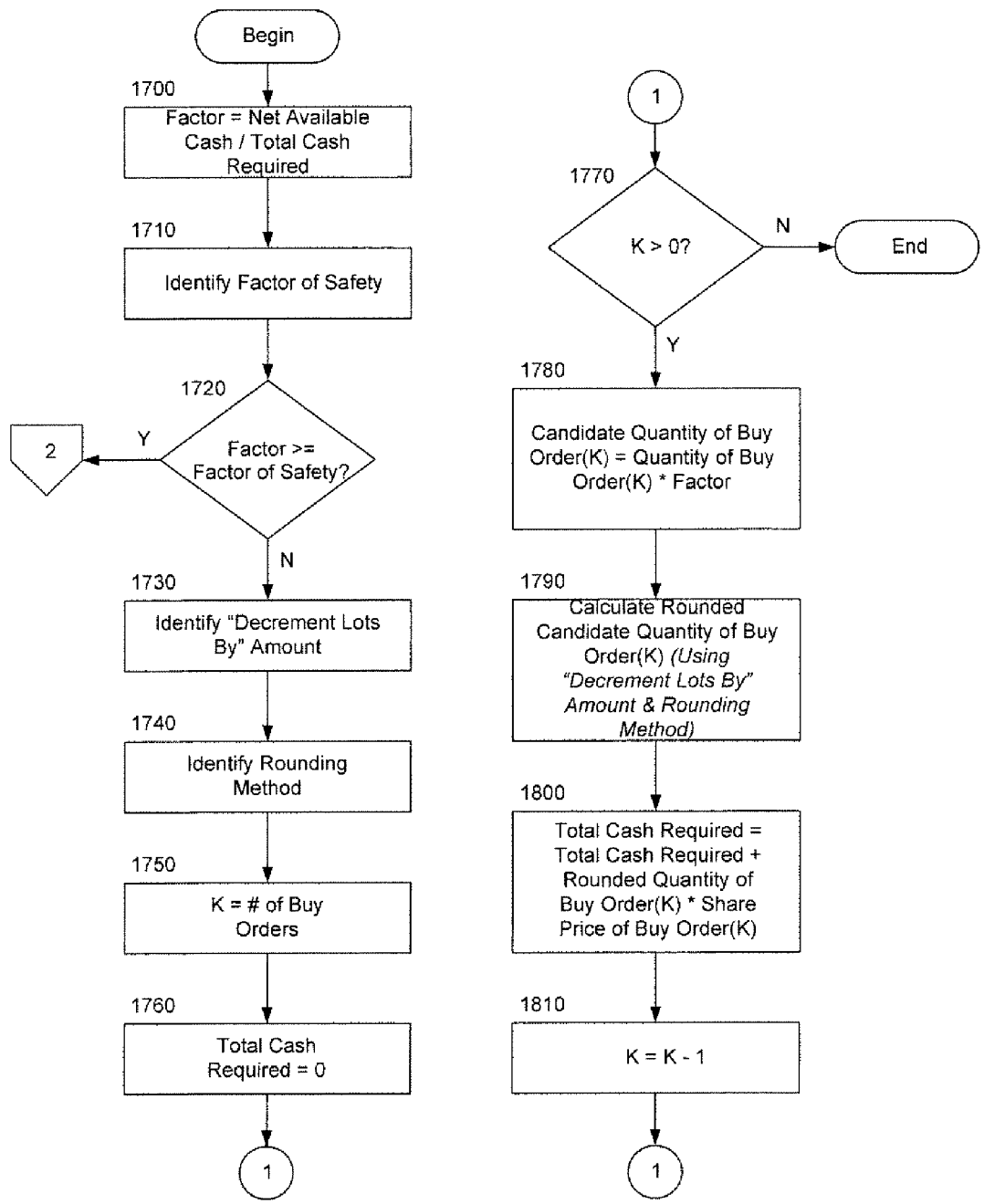
FIG. 13 illustrates an exemplary adjustment of buy orders by a factor and the recalculation of the total cash required.

FIG. 13 illustrates step 1640 in further detail. In step 1700, a factor may be calculated as the ratio of net available cash to total cash required. Initially, this value will always be between 0 and 1 (and always <1 if this processing is reached), but with iterations of executing this processing, the value of the factor could creep above 1 as total cash required is adjusted. A value of 1 may mean that net available cash is sufficient for the total cash required.

In step 1710, a "factor of safety" value may be identified. According to an embodiment of the present invention, this factor of safety value may be close to 1 (e.g., 0.98 or 0.99) that will allow a set of buy orders for which there doesn't appear to be quite enough cash available to be proposed. This may reflect an inherent uncertainty of intraday fluctuations in the investment account cash bucket and intraday fluctuations in market pricing. The value for the "factor of safety" may be chosen by the portfolio management system 100 customer or established as a default by the portfolio management system 100. As with other parameters, if chosen by the portfolio management system 100 customer, it could be scoped to a particular set of investment accounts.

In step 1720, a test may be performed to see if the calculated factor is greater than or equal to the identified "factor of safety" of step 1710. If it is, then processing may continue with step 1660, in which all the buy orders (potentially adjusted if step 1640 has been performed more than once) are simply proposed for execution. Otherwise, processing continues with step 1730.

Steps 1730-1760 are preparatory set-up for the processing loop between steps 1770 and 1810, in which each identified buy order will be adjusted. Quantities associated with each buy order will be adjusted by discrete amounts; in step 1730, the amount by which to round the quantities (lots) may be identified. This amount can be chosen by the portfolio management system 100 customer or set as a default by the portfolio management system 100. If chosen by the portfolio management system 100 customer, it could be scoped to a particular set of investment accounts, as with the back out method. In step 1740, the rounding method may be identified. According to one embodiment of the present invention, the rounding method may be one of the following:

1. Up. If the adjusted quantity is between two integer multiples of the "decrement lots by" amount, increment to the higher integer multiple.
2. Down. If the adjusted quantity is between two integer multiples of the "decrement lots by" amount, decrement to the lower integer multiple.
3. Nearest. If the adjusted quantity is between two integer multiples of the "decrement lots by" amount, use the closest integer multiple value.

The rounding method can also be chosen by the portfolio management system 100 customer or set as a default by the portfolio management system 100. If chosen by the portfolio management system 100 customer, it could be scoped to a particular set of investment accounts, as with the back out method. In step 1750, an iteration limit (K) may be set to the number of buy orders under consideration (e.g., those identified in step 200). In step 1760, an accumulator for total cash required may be reset (e.g., reset to 0). Then the loop processing to adjust each buy order and recalculate total cash required proceeds between steps 1770 and 1810.

Step 1770 may check to see if the iteration limit has been reached (i.e., all buy orders have been processed). If so, then a new total cash required value has been calculated and processing can resume with step 1650. If not processing continues with step 1780.

In step 1780, a candidate new quantity for the Kth buy order is determined by multiplying the (initial) quantity of the Kth buy order by the factor. In step 1790, this candidate new quantity may be adjusted using the identified "decrement lots by" amount and the identified rounding method to produce a rounded quantity. Then, in step 1800, this rounded quantity may be multiplied by the share price of the security associated with the Kth buy order, and the result may be added to the accumulator total cash required value. Finally, the iteration limit is decremented in step 1810, and processing then continues back at the top of the loop in step 1770.

Alternatives to various aspects of this disclosed method are available according to embodiments of the present invention. According to one such embodiment, the iteration limit may be defined by some parameter. Such a parameter could be established by the portfolio management system 100 customer or set as a system default for the portfolio management system 100. As with other parameters, if chosen by the portfolio management system 100 customer, it could be scoped to a particular set of investment accounts. If multiple values apply in a given situation, the portfolio management system 100 could prioritize and select the right one to use as described herein.

It will be appreciated that none of the back out methods were discussed above referenced trading fees and other commissions, if any, that may be due with buy and/or sell orders.

According to an embodiment of the present invention, any trading fees and other commissions may be accounted for according to the determination of net available cash, the total cash required, and/or the back out target value. According to another embodiment of the present invention, the trading fees and other commissions may be allocated to the each buy order in the candidate set. For example, the market price of a security may be adjusted slightly to account for the trading fees and commissions. Many other variations of accounting for the trading fees and commission are available without departing from embodiments of the present invention.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method, comprising:
    identifying a candidate set of buy orders associated with an investment account, wherein the candidate set includes at least a first buy order and a second buy order;
    determining that total cash required to fund the candidate set of buy orders exceeds net available cash in the investment account;
    subsequent to determining that the total cash required exceeds the net available cash, linking the buy orders in the candidate set into a chain, wherein the first buy order is linked to the second buy order;
    determining a back out target value that identifies a fiscal amount by which the candidate set must be reduced;
    identifying a decrementation amount;
    decrementing, in accordance with an ordering associated with the chain, a respective asset quantity of two or more non-zero quantity buy orders, including a first asset quantity of the first buy order and a second asset quantity of the second buy order, to a respective final asset quantity until the back out target value is achieved by:
        decrementing the first asset quantity of the first buy order by a first amount that is either (i) equal to the identified decrementation amount or (ii) derived from the identified decrementation amount and a first asset price associated with a first asset of the first buy order,
        determining that an impact of the decrementing the first asset quantity of the first buy order is insufficient to achieve the back out target value,
        subsequent to determining that the impact of decrementing the first asset quantity is insufficient to achieve the back out target value, decrementing the second asset quantity by a second amount that is either (i) equal to the identified decrementation amount or (ii) derived from the identified decrementation amount and a second asset price associated with a second asset of the second buy order, and
        determining that a cumulative impact of decrementing at least the first asset quantity of the first buy order and the second asset quantity of the second buy order is sufficient to achieve the back out target value;
    modifying the candidate set of buy orders by (i) excluding any of the buy orders for which the respective final asset quantity is zero or (ii) replacing a respective initial asset quantity with the respective final asset quantity for any of the buy orders for which the respective final asset quantity is different than the respective initial asset quantity; and
    providing the modified candidate set of buy orders for trade execution,
    wherein one or more computers associated with a portfolio management system are programmed to perform the prior steps.

2. The method of claim 1, wherein the chain is a circular chain, wherein an initial buy order and a last buy order are linked in the circular chain.

3. The method of claim 1, wherein the decrementation amount is based upon a fixed asset quantity or a fixed monetary amount.

4. The method of claim 1, wherein the linking of the buy orders in the candidate set into the chain comprises:
    sorting the candidate set of buy orders in order of (i) descending asset quantity or (ii) ascending asset quantity.

5. The method of claim 4, wherein the decrementing further comprises:
    determining an initial buy order to be decremented as a buy order of the candidate set of buy orders with a largest asset quantity; and
    following each instance of decrementing in which the back out target value has not yet been achieved, resorting the non-zero asset quantity buy orders in the chain, wherein a next buy order to be decremented is determined as a buy order of the resorted buy orders with a largest current asset quantity.

6. The method of claim 5, wherein resorting includes resorting the non-zero asset quantity buy orders in the chain in order of (i) descending current asset quantity or (ii) ascending current asset quantity.

7. The method of claim 3, wherein the decrementation amount is based upon the fixed asset quantity, and wherein the decrementation amount is (i) chosen by a customer associated with the investment account, (ii) established as a system default, or (iii) selected from a plurality of possible fixed integer values.

8. The method of claim 3, wherein the decrementation amount is based upon the fixed monetary amount, and wherein the respective amount, including the first amount or the second amount, is derived as an integer approximation of fixed monetary amount divided by a respective asset price associated with the respective asset of the respective buy order, and wherein the decrementation amount is (i) chosen by the customer associated with the investment account, (ii) established as the system default, or (iii) selected from a plurality of possible fixed monetary amounts.

9. The method of claim 1, wherein the decrementation amount is selected from a plurality of possible fixed integer quantity values, and wherein the selection is based on a scope attribute associated with the investment account.

10. The method of claim 9, wherein the scope attribute is selected from the group consisting of: (i) an identification of the investment account, (ii) an identification of a style associated with the investment account, (iii) an identification of a strategy associated with the investment account, (iv) an identification of a program associated with the investment account, and (v) an identification of a customer associated with the investment account.

11. The method of claim 1, wherein the back out target value is selected from a plurality of possible fiscal amounts, and the selection is based on a scope attribute associated with the investment account.

12. The method of claim 11, wherein the scope attribute is selected from the group consisting of: (i) an identification of the investment account, (ii) an identification of a style associated with the investment account, (iii) an identification of a strategy associated with the investment account, (iv) an identification of a program associated with the investment account, and (v) an identification of a customer associated with the investment account.

13. A system, comprising:
a memory for storing computer program instructions;
a processor in communication with the memory, wherein the processor is operable to execute the computer program instructions to:
identify a candidate set of buy orders associated with an investment account, wherein the candidate set includes at least a first buy order and a second buy order;
determine that total cash required to fund the candidate set of buy orders exceeds net available cash in the investment account;
subsequent to determining that the total cash required exceeds the net available cash, link the buy orders in the candidate set into a chain, wherein the first buy order is linked to the second buy order;
determine a back out target value that identifies a fiscal amount by which the candidate set must be reduced;
identifying a decrementation amount;
decrement, in accordance with an ordering associated with the chain, a respective asset quantity of two or more non-zero quantity buy orders, including a first asset quantity of the first buy order and a second asset quantity of the second buy order, to a respective final asset quantity until the back out target value is achieved by:
decrementing the first asset quantity of the first buy order by a first amount that is either (i) equal to the identified decrementation amount or (ii) derived from the identified decrementation amount and a first asset price associated with a first asset of the first buy order;
determining that an impact of the decrementing the first asset quantity of the first buy order is insufficient to achieve the back out target value,
subsequent to determining that the impact of decrementing the first asset quantity is insufficient to achieve the back out target value, decrementing the second asset quantity by a second amount that is either (i) equal to the identified decrementation amount or (ii) derived from the identified decrementation amount and a second asset price associated with a second asset of the second buy order, and
determining that a cumulative impact of decrementing at least the first asset quantity of the first buy order and the second asset quantity of the second buy order is sufficient to achieve the back out target value;
modify the candidate set of buy orders by (i) excluding any of the buy orders for which the respective final asset quantity is zero or (ii) replacing a respective initial asset quantity with the respective final asset quantity for any of the buy orders for which the respective final asset quantity is different than the respective initial asset quantity; and
provide the modified candidate set of buy orders for trade execution.

14. The system of claim 13, wherein the chain is a circular chain, wherein an initial buy order and a last buy order are linked in the circular chain.

15. The system of claim 13, wherein the decrementation amount is based upon a fixed asset quantity or a fixed monetary amount.

16. The system of claim 15, wherein the decrementation amount is based upon the fixed asset quantity, and wherein the decrementation amount is (i) chosen by a customer associated with the investment account, (ii) established as a system default, or (iii) selected from a plurality of possible fixed integer values.

17. The system of claim 15, wherein the decrementation amount is based upon the fixed monetary amount, and wherein the respective amount, including the first amount or the second amount, is derived as an integer approximation of fixed monetary amount divided by a respective asset price associated with the respective asset of the respective buy order, and wherein the decrementation amount is (i) chosen by the customer associated with the investment account, (ii) established as the system default, or (iii) selected from a plurality of possible fixed monetary amounts.

18. The system of claim 13, wherein the processor is operable to link of the buy orders in the candidate set into the chain by:
sorting the candidate set of buy orders in order of (i) descending asset quantity or (ii) ascending asset quantity.

19. The system of claim 18, wherein the decrementing further comprises:
determining an initial buy order to be decremented as a buy order of the candidate set of buy orders with a largest asset quantity; and
following each instance of decrementing in which the back out target value has not yet been achieved, resorting the non-zero asset quantity buy orders in the chain, wherein a next buy order to be decremented is determined as a buy order of the resorted buy orders with a largest current asset quantity.

20. The system of claim 19, wherein resorting includes resorting the non-zero asset quantity buy orders in the chain in order of (i) descending current asset quantity or (ii) ascending current asset quantity.

21. The system of claim 13, wherein the decrementation amount is selected from a plurality of possible fixed integer quantity values, and wherein the selection is based on a scope attribute associated with the investment account.

22. The system of claim 21, wherein the scope attribute is selected from the group consisting of: (i) an identification of the investment account, (ii) an identification of a style associated with the investment account, (iii) an identification of a strategy associated with the investment account, (iv) an identification of a program associated with the investment account, and (v) an identification of a customer associated with the investment account.

23. The system of claim 13, wherein the back out target value is selected from a plurality of possible fiscal amounts, and the selection is based on a scope attribute associated with the investment account.

24. The system of claim 23, wherein the scope attribute is selected from the group consisting of: (i) an identification of the investment account, (ii) an identification of a style associated with the investment account, (iii) an identification of a strategy associated with the investment account, (iv) an identification of a program associated with the investment account, and (v) an identification of a customer associated with the investment account.

* * * * *